(12) United States Patent
Gentry, Jr.

(10) Patent No.: US 6,434,651 B1
(45) Date of Patent: Aug. 13, 2002

(54) METHOD AND APPARATUS FOR SUPPRESSING INTERRUPTS IN A HIGH-SPEED NETWORK ENVIRONMENT

(75) Inventor: Denton E. Gentry, Jr., Fremont, CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/260,367

(22) Filed: Mar. 1, 1999

(51) Int. Cl.$^7$ ................................................. G06F 9/48

(52) U.S. Cl. ...................................... 710/260; 709/235

(58) Field of Search ......................... 710/260; 709/235, 709/250

(56) References Cited

U.S. PATENT DOCUMENTS

| | | | |
|---|---|---|---|
| 5,319,752 A | | 6/1994 | Petersen et al. |
| 5,485,584 A | | 1/1996 | Hausman et al. |
| 5,659,758 A | | 8/1997 | Gentry et al. |
| 5,797,037 A | | 8/1998 | Ecclesine |
| 6,065,073 A | * | 5/2000 | Booth ......................... 370/908 |
| 6,105,102 A | * | 8/2000 | Williams et al. ............. 710/261 |
| 6,256,660 B1 | * | 7/2001 | Govindaraju et al. ....... 709/200 |

FOREIGN PATENT DOCUMENTS

| | | | |
|---|---|---|---|
| EP | 0752799 A2 | 1/1997 | ........... H04Q/11/04 |
| EP | 0852357 A2 | 7/1998 | ........... G06F/13/24 |
| GB | 2 282 474 | 4/1995 | |

OTHER PUBLICATIONS

Pending U.S. patent application Ser. No. 09/259,445, entitled "Method and Apparatus for Distributing Network Processing on a Multiprocessor Computer," by Shimon Muller et al., filed Mar. 1, 1999 (Attorney Docket SUN–P3481–JTF).

Pending U.S. patent application Ser. No. 09/259,736, entitled "Method and Apparatus for Modulating Interrupts in a Network Interface," by Denton Gentry et al., filed Mar. 1, 1999 (Attorney Docket SUN–P3483–JTF).

Pending U.S. patent application Ser. No. 09/259,765, entitled "A High Performance Network Interface," by Shimon Muller et al., filed Mar. 1, 1999 (Attorney Docket SUN–P3485–JTF).

(List continued on next page.)

*Primary Examiner*—Glenn A. Auve
(74) *Attorney, Agent, or Firm*—Park, Vaughan & Fleming LLP

(57) ABSTRACT

A network interface is polled by a process operating on a host computer system. Each time the network interface is polled, the process determines whether any packets have been received. If so, they are processed. Interrupts that would normally be issued by the network interface in response to the transfer of packets to the host system are suppressed or postponed during the polling mode of operation. If, however, a predetermined period of time has elapsed or a predetermined number of packets have been received since a previous poll or a previous interrupt, then an interrupt may be generated. The rate at which interrupts may be issued is modulated to decrease the interrupt-processing burden placed on the processor. A time counter may be used to track the passage of time and a packet counter may be used to track the number of packets transferred by the network interface. After each polling operation or processing of an interrupt by the host processor, the time and packet counters are reset to threshold values and thereafter begin decrementing toward a final time count and a final packet count, respectively. Thus, a packet transferred after one polling operation or interrupt does not cause the issuance of an interrupt to the host processor unless a time or packet counter reaches its final value (e.g. zero). The threshold time count and packet count may be adjusted to ensure that interrupts are generated often enough to avoid a negative impact on the processing of packets if, for example, the polling process is blocked.

53 Claims, 7 Drawing Sheets

OTHER PUBLICATIONS

Pending U.S. patent application Ser. No. 09/260,618, entitled "Method and Apparatus for Classifying Network Traffic in a High Performance Network Interface," by Shimon Muller et al., filed Mar. 1, 1999 (Attorney Docket SUN–P3486–JTF).

Pending U.S. patent application Ser. No. 09/259,932, entitled "Method and Apparatus for Managing a Network Flow in a High Performance Network Interface," by Shimon Muller et al., filed Mar. 1, 1999 (Attorney Docket SUN–P3487–JTF).

Pending U.S. patent application Ser. No. 09/260,324, entitled "Method and Apparatus for Dynamic Packet Batching with a High Performance Network Interface," by Shimon Muller et al., filed Mar. 1, 1999 (Attorney Docket SUN–P3488–JTF).

Pending U.S. patent application Ser. No. 09/258,952, entitled "Method and Apparatus for Early Random Discard of Packets," by Shimon Muller et al., filed Mar. 1, 1999 (Attorney Docket SUN–P3490–JTF).

Pending U.S. patent application Ser. No. 09/260,333, entitled "Method and Apparatus for Data Re–Assembly with a High Performance Network Interface," by Shimon Muller et al., filed Mar. 1, 1999 (Attorney Docket SUN–P3507–JTF).

Pending U.S. patent application Ser. No. 09/258,955, entitled "Dynamic Parsing in a High Performance Network Interface," by Denton Gentry, filed Mar. 1, 1999 (Attorney Docket SUN–P3715–JTF).

Pending U.S. patent application Ser. No. 09/259,936, entitled "Method and Apparatus for Indicating an Interrupt in a Network Interface," by Denton Gentry et al., filed Mar. 1, 1999 (Attorney Docket SUN–P3814–JTF).

* cited by examiner

METHOD AND APPARATUS FOR SUPPRESSING INTERRUPTS IN A HIGH-SPEED NETWORK ENVIRONMENT

BACKGROUND

This invention relates to the field of computer networks. In particular, the present invention provides a system and method for modulating or suppressing the issuance of interrupts from a communication device such as a network interface circuit (NIC).

The interface between a computer and a network is often a bottleneck for communications passing between the computer and the network. While computer performance (e.g., processor speed) has increased exponentially over the years and computer network transmission speeds have undergone similar increases, inefficiencies in the way network interface circuits handle communications have become more and more evident. With each incremental increase in computer or network speed, it becomes ever more apparent that the interface between the computer and the network cannot keep pace. These inefficiencies involve several basic problems in the way communications between a network and a computer are handled. Similar inefficiencies exist in other communication devices and conduits, including network devices such as routers, gateways, switches and input/output devices such as media (e.g., disk drive) controllers.

Today's most popular forms of networks tend to be packet-based. These types of networks, including the Internet and many local area networks, transmit information in the form of packets. Each packet is separately created and transmitted by an originating endstation and is separately received and processed by a destination endstation. In addition, each packet may, in a bus topology network for example, be received and processed by numerous stations located between the originating and destination endstations.

One basic problem with packet networks is that it may take many packets to communicate a given amount of data from one endstation to another. When data transmitted between stations is longer than a certain minimal length, the data is divided into multiple portions, and each portion is carried by a separate packet. The amount of data that a packet can carry may be limited by the network that conveys the packet and is often expressed as a maximum transfer unit (MTU). The original aggregation of data is sometimes known as a "datagram," and each packet carrying part of a single datagram may be processed very similarly to the other packets of the datagram.

As the amount of data to be transmitted increases, the number of packets that must be sent to, and processed by, a destination endstation increase as well. Naturally, the more packets that must be processed, the greater the demand placed upon an endstation's processor and the network interface serving that endstation. The number of packets that must be processed is affected by factors other than just the amount of data being sent in a datagram. For example, as the amount of data encapsulated in a packet increases, fewer packets need to be sent. As stated above, however, a packet may have a maximum allowable size, depending on the type of network in use (e.g., the maximum transfer unit for standard Ethernet traffic is approximately 1,500 bytes). The speed of the network also affects the number of packets that a NIC may handle in a given period of time. For example, a gigabit Ethernet network operating at a peak rate may require a NIC to receive approximately 1.48 million packets per second. Thus, the number of packets to be processed may place a significant burden upon a computer's processor.

The situation is exacerbated by the need to process each packet separately even though each one will be processed in a substantially similar manner.

Another obstacle to the efficient interaction of network interface circuits and host computers or other communication devices arises from the decreased host processor utilization that results when a network interface circuit issues numerous interrupts. In particular, in many present network interface circuits an interrupt may be issued to a host processor for each packet transferred to a host computer from a network. As the rate of network traffic increases, the rate of interrupt generation increases commensurately. The more packets that arrive at a network interface circuit, therefore, the more time the processor must spend on context switches and processing the interrupt, and the lower the effective utilization of the processor.

As the performance of a network interface circuit increases and packets are transferred to a host processor at a faster and faster rate, the rate of interrupt generation may approach a level that, given the time necessary for the processor to process an interrupt, monopolizes processor utilization. In fortuitous circumstances a processor may be able to process multiple packets during one interrupt service routine, but this may be offset by the high rate of packet arrival. Without a mechanism for suppressing or modulating the rate at which interrupts are generated from a network interface, a network interface capable of high performance may overwhelm a host processor. The rate of arrival of packets at a network interface circuit may become so high that the processor must spend an inordinate amount of time just servicing the interrupts and processing the packets received in between interrupts, thus severely diminishing its ability to perform other tasks.

Another method by which a host processor may learn of the receipt of network traffic is polling. An endstation may, for example, poll a network interface circuit to determine if there are any packets to be processed. Polling is inefficient, however, unless the level of network traffic is relatively high. In addition, if polling should be blocked or otherwise become unable to continue operation in existing implementations, network traffic may be brought to a standstill.

Thus, present methods of alerting host processors to the receipt of network traffic often fail to provide adequate performance to interconnect today's high-end computer systems and high-speed networks. A network interface circuit that cannot make allowance for an over-burdened host computer may seriously degrade the computer's performance. In particular, the use of interrupts may degrade a host processor's performance during a high level of traffic, and polling may be unsuitable for lower levels of traffic.

SUMMARY

In one embodiment of the invention, a system and method for polling a network interface are provided. In this embodiment an interrupt that would normally alert a host processor to the arrival of a network packet is suspended during a polling mode of operation. Each time the network interface is polled, any waiting packets are processed. However, if a threshold amount of time passes, or a threshold number of packets are received without being processed, interrupts may be enabled to ensure the packets are serviced. Thus, a polling mode of operation may be combined with interrupt modulation in one embodiment of the invention.

A network interface receives packets from a network for transfer to a host computer. Prior to the commencement of polling, when a packet is received by the network interface and transferred to the host computer an interrupt may be generated to alert a host processor. However, processing interrupts may cause significant overhead for the processor depending upon the level of traffic received at the network interface. Therefore, one or more embodiments of the present invention are configured to decrease the number of interrupts generated in response to the transfer of network packets without preventing the packets from being processed in a timely manner. More specifically, the generation of interrupts is suspended during a polling mode of operation. Each time the network interface is polled, received packets may be processed without having to wait for an interrupt. Thus, in one embodiment of the invention no interrupts are generated during a polling mode of operation.

If polling should fail or be blocked, however, the generation of interrupts may be re-enabled. The rate at which interrupts may then be issued to the host computer may be modulated in order to ensure that the host computer has time to perform other functions. In particular, in one embodiment an interrupt is not issued for a received packet unless a minimum period of time has passed or a minimum number of packets have been received since a previous poll of the network interface or since a previous interrupt was processed.

Each time the network interface is polled, and upon the completion of processing of an interrupt by a host processor, a time counter and/or a packet counter are initialized. Illustratively, the counters are set to programmable threshold values representing, respectively, a maximum period of time that is allowed to pass and a maximum number of packets that may be received before issuing another interrupt. After initialization, the counters begin decrementing toward final programmable values (e.g., zero). As long as polling continues in this embodiment, the counters will be repeatedly re-initialized and will therefore never expire and no interrupts will be generated. In an alternative embodiment, the counters are initialized to initial values and thereafter increment toward threshold values.

In one embodiment of the invention a polling process or software module operating on a host computer polls the network interface by examining a virtual or "alias" register that mirrors the network interface's status register. Such an alias register serves as an alternative path (e.g., address) by which to read the status register. Therefore, when an indicator in the status register changes state to indicate a specific event or condition in the network interface, the corresponding indicator in the alias register also changes. When the network interface is polled, if an indicator in the alias register is set to a state indicating the transfer of a packet, the polling module processes the waiting packet(s). Because the polling module reads the alias register instead of the status register, the alias register is cleared each time the polling module polls the network interface. When the alias register is cleared one or more indicators in the status register may also be cleared, as determined by a programmable mask. Illustratively, the mask comprises a number of entries, each of which corresponds to both an indicator in the status register and a matching indicator in the alias register. The value in each mask entry determines whether an associated status register indicator is cleared when a corresponding alias register indicator is cleared.

In another embodiment of the invention a feedback indicator is added to or associated with the network interface's status register. The feedback indicator helps avoid an interrupt-claiming problem that may otherwise occur when the polling module clears the status register before an interrupt handler responding to an interrupt can examine the status register and determine why it was called. In particular, when an interrupt is generated because of a status register indicator (other than the feedback indicator) changing state, the feedback indicator is set to a state that indicates an interrupt was generated. Then, although the rest of the status register may be cleared by the polling module by the time the interrupt handler reads the register, the feedback indicator will reveal that a valid interrupt was issued. Without the feedback indicator an error recovery procedure may be initiated, thus hindering the operation of the network interface, if the interrupt handler cannot determine why it was invoked. In this embodiment the polling software may examine the status register directly during each poll, or an alias register may be employed as described above. If an alias register is used, the mask discussed above is configured so that the feedback indicator is not cleared when the alias register is cleared.

DETAILED DESCRIPTION

Figure 1:
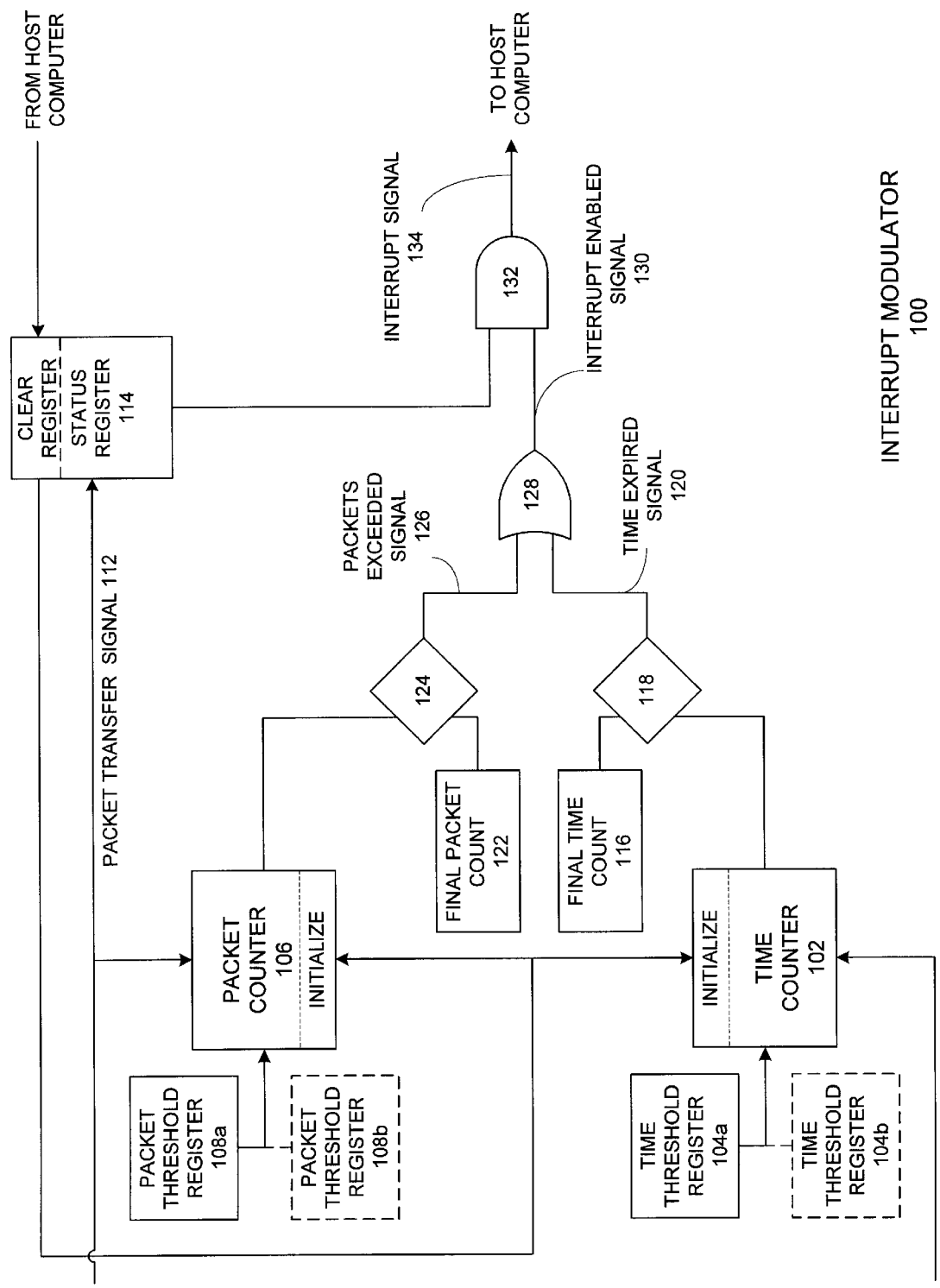
FIG. 1 is an interrupt modulator for modulating interrupts generated by a network interface circuit in accordance with an embodiment of the invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, embodiments of the invention are described below in the form of a network interface circuit (NIC) receiving communication packets formatted in accordance with certain communication protocols compatible with the Internet. One skilled in the art will recognize, however, that the present invention is not limited to communication protocols compatible with the Internet and may be readily adapted for use with other protocols and in communication devices other than a NIC.

The program environment in which a present embodiment of the invention is executed illustratively incorporates a general-purpose computer or a special purpose device such a hand-held computer. Details of such devices (e.g., processor, memory, data storage, input/output ports and display) are well known and are omitted for the sake of clarity.

It should also be understood that the techniques of the present invention might be implemented using a variety of technologies. For example, the methods described herein may be implemented in software running on a programmable microprocessor, or implemented in hardware utilizing either a combination of microprocessors or other specially designed application specific integrated circuits, programmable logic devices, or various combinations thereof. In particular, the methods described herein may be implemented by a series of computer-executable instructions residing on a storage medium such as a carrier wave, disk drive, or other computer-readable medium.

Introduction

In one embodiment of the present invention, a network interface circuit (NIC) is configured to receive and process communication packets exchanged between a host computer system and a network such as the Internet. In particular, the NIC is configured to receive and manipulate packets formatted in accordance with a protocol stack (e.g., a combination of communication protocols) supported by a network coupled to the NIC.

A protocol stack may be described with reference to the seven layer ISO-OSI (International Standards Organization—Open Systems Interconnection) model framework. Thus, one illustrative protocol stack includes the Transport Control Protocol (TCP) at layer four, Internet Protocol (IP) at layer three and Ethernet at layer two. For purposes of discussion, the term "Ethernet" may be used herein to refer collectively to the standardized IEEE (Institute of Electrical and Electronics Engineers) 802.3 specification as well as version two of the non-standardized form of the protocol. Where different forms of the protocol need to be distinguished, the standard form may be identified by including the "802.3" designation.

Other embodiments of the invention are configured to work with communications adhering to other protocols, both known (e.g., Appletalk, IPX (Internetwork Packet Exchange), ATM (Asynchronous Transfer Mode) etc.) and unknown at the present time. One skilled in the art will recognize that the methods provided by this invention are easily adaptable for new communication protocols.

In addition, the processing of packets, modulation of interrupts, and polling operations described below may be performed on communication devices other than a NIC. For example, a modem, switch, router or other communication port (e.g., serial, parallel, USB, SCSI) or device may be similarly configured and operated. Although information is conveyed in packet form in one or more embodiments of the invention described below, in other embodiments "packets" may comprise other aggregations of data or information. For example, an embodiment discussed below may be applicable to a disk controller (e.g., for a magnetic or optical disk) or other media controller that receives or processes data in units other than packets.

In previous implementations of network interface circuits, an interrupt may be generated by the NIC for every packet, or almost every packet, that is transferred by the NIC to a host computer. With such a NIC, as the level of traffic received from a network increases, a host processor responsible for processing network traffic may become unduly burdened by the processing requirements of so many interrupts. Therefore, various embodiments of the invention discussed below provide methods of modulating, limiting or suppressing the issuance of interrupts to a host computer system in response to the receipt of packets from a network.

Illustratively, different embodiments of the invention are directed to different levels of network traffic. In particular, as network traffic increases, more and more interrupts may need to be suppressed. However, as this is done a host processor may encounter more and more packets to be processed during each interrupt. Therefore, for even higher levels of network traffic a polling mode of operation may be initiated in order to eliminate the need for interrupts altogether.

In a polling mode of operation interrupts may be completely suppressed as long as the polling module (e.g., software operating on a host computer) continues to operate with the desired frequency. Interrupts may be re-enabled, with or without modulation, if the polling module is blocked or otherwise ceases to function.

An Interrupt Modulator for Moderate Network Traffic

In one embodiment of the invention an interrupt modulator is provided for modulating the rate at which interrupts are issued to a host computer in response to the transfer of packets by a network interface circuit (NIC). In this section, an interrupt modulator and methods of modulation are described that are particularly suitable for moderate levels of traffic and beyond.

Defining the scope of a particular level of traffic, whether "light," "moderate," "heavy" or otherwise, is necessarily imprecise. However, one method of classifying a level of traffic may take into account both the number of packets received at the network interface and the power or capability of a processor that will process the packets. This method takes into account the fact that a faster or more capable processor may be able to process a greater number of packets in a given period of time than a slower or less capable processor. In other words, receiving one million packets per second and an interrupt for each packet may seem like a heavy load to one processor, but may place little burden on a faster processor.

In order to take into account both the rate of packet transfers to a host computer and a host processor's speed, the level of traffic received at the network traffic may be measured by the number of packets processed each time an interrupt from the network interface is serviced. Typically, a network interface circuit issues an interrupt to a host processor when a packet arrives from a network and is transferred to the host computer. Depending upon the speed or configuration of the processor, it may not be able to immediately perform the necessary interrupt processing before another packet is received and another interrupt is issued. Thus, by the time the processor actually responds to the first interrupt, it may end up processing a number of packets that arrived soon after the first. If, on the other hand, the processor is very fast, it may be able to respond to each individual interrupt in such a timely manner that it rarely, if ever, processes more than one packet at a time.

Therefore, for purposes of describing the level of traffic received at a network interface circuit in a present embodiment of the invention, a moderate load may be considered to exist when a host processor processes approximately ten packets during an interrupt. If less than ten packets are processed in an interrupt, the traffic level may be considered light. And, a heavy load may be marked by the processing of approximately fifty packets during an interrupt service routine. These packet measures may be averages or median values taken over a given period of time or may be instantaneous measurements made during the processing of an individual interrupt. In addition, these figures are not rigid and may be altered in accordance with factors such as the size and types of packets (e.g., in terms of protocols).

In this section a method of modulating interrupts generated in response to the receipt of a moderate level of traffic is described. The following section describes a method of modulating or suppressing interrupts in a heavy traffic environment. The interrupt modulators and methods of modulating interrupts described in these sections may also be applied to modulate the rate of interrupts issued in response to the transmission of packets from the network interface circuit to a network.

As already described, in some network interface circuits an interrupt might be issued to a host computer for every packet received from a network or transferred to the host computer. The faster the rate at which packets are transferred, the more time a host processor must spend handling interrupts associated with the network traffic and the less time that the processor may spend on other tasks. By modulating the rate at which interrupts are issued to a host computer from a communication device such as a network interface circuit, the ratio of interrupts to packets may be decreased from 1:1 to 1:N, where N>1. Decreasing the number of network interface interrupts that a host computer must respond to allows it to be more responsive to other tasks (e.g., user activity) and may decrease the amount of processor time used to process network traffic. In particular, once network traffic increases to what may be considered a moderate level, a host processor will likely benefit from a decrease in the number of interrupts that must be handled.

In one embodiment of the invention, interrupts normally generated when packets are received by a NIC and transferred to a host computer are alternatingly disabled and enabled. In particular, after one interrupt is issued to and serviced by a host processor, another interrupt is not generated until a predetermined period of time has passed or a specified amount of network traffic has been sent to the host computer system. In this embodiment a time counter may be used to track the passage of time (e.g., as indicated by a clock signal) and/or a packet counter may be used to track the transfer of packets to the host. In an alternative embodiment of the invention, a content counter may be used to track the amount of traffic sent to the host in units other than packets (e.g., bytes, datagrams).

Illustratively, the time counter and packet counter are set to threshold values after a host computer processes an interrupt. Suitable threshold values, which may be stored in programmable registers or other data structures, are twenty microseconds of time and seven packets for a moderate level of traffic. Thereafter, the time counter decrements (e.g., counts down toward zero) in response to a clock signal or other means of noting the passage of time, and the packet counter decrements in response to a packet transfer signal or other indicator that a packet was transferred to the host computer. For example, a packet transfer signal may be generated by a NIC module responsible for copying a packet to host memory. Until either the time counter or packet counter reaches zero or some other final value, which may be stored in a register or other programmable data storage unit, an interrupt will not be generated in response to the transfer of a packet. After a final value is reached, an interrupt may be generated for a packet transferred after the last interrupt, was processed by the host computer.

In one embodiment of the invention, the programmable threshold time and packet values may be increased as the rate of packets arriving at the network interface increases or the number of packets processed during each interrupt increases. And, although the counters decrement from threshold values toward final values (e.g., zero) in this embodiment of the invention, in an alternate embodiment they are set to initial values (e.g., zero) and thereafter increment toward their threshold values.

U.S. Pat. No. 5,659,758 (the "'758 patent"), issued on Aug. 19, 1997, describes an Interrupt Modulator for Receiving Bursty High Speed Network Traffic and is hereby incorporated by reference. The '758 patent describes the use of counters that are reset upon the issuance of an interrupt to a host computer. In other words, in the '758 patent a time or packet counter is reset at the time an interrupt is generated by a network interface and thereafter increments—even during the servicing of the interrupt.

Interrupt modulation according to the present invention differs from that of the '758 patent in how the time and packet counters are reset. In particular, rather than being reset at the time the interrupt is issued, in a present embodiment of the invention the counters are not reset until after the host computer processes an interrupt. As described above, in one embodiment of the invention a second interrupt is not initiated by a network interface until a minimum period of time passes or a specified number of packets are received after a host processor completes servicing a first interrupt. One skilled in the art will recognize that the present scheme provides additional time separation between successive interrupts and thus further decreases the amount of host processor time expended in servicing interrupts from the network interface. Under the '758 patent, if a host processor requires nearly a full threshold of time (e.g., twenty microseconds) to finish its processing of one interrupt, interrupts may be enabled and an interrupt issued shortly after the first one is serviced.

FIG. 1 is a diagram of an interrupt modulator for a NIC according to one embodiment of the invention. In this embodiment time and packet counters are set to their threshold values (e.g. twenty microseconds and seven packets, respectively) after an interrupt is processed by a host computer and then decremented in accordance with the passage of time and the transfer of packets. A counter expires when it reaches a final value (e.g., zero), at which time another interrupt may be generated. Although threshold values of approximately twenty microseconds and approximately seven packets are employed in embodiments of the invention discussed below, in alternative embodiments a wide range of thresholds will be suitable. In particular, one network environment in which an embodiment of the invention may be practiced (e.g., such as the Internet) employs Ethernet, IP and TCP protocols, respectively, at layers two, three and four of an associated protocol stack. In this environment a range of twenty to fifty microseconds may be appropriate for a time counter and a range of four to ten packets may be appropriate for a packet counter.

Suitable thresholds may be determined in accordance with the protocols to which packets received at a particular NIC conform or some other characteristic of a particular network environment. Some protocols may be able to function properly even when the processing of packets and interrupts is delayed longer than seven packets or twenty microseconds. For example, the Network File System (NFS) protocol may be able to use a time threshold of approximately one millisecond and a packet threshold of approximately fifty.

In the illustrated embodiment of the invention, interrupts are transmitted to a host processor by a PCI (Peripheral Component Interconnect) bus. In particular, the issued interrupt corresponds to the PCI INTA signal that may be generated in response to the transfer of a packet from a network interface to a host computer.

In FIG. 1, interrupt modulator 100 includes time counter 102 and packet counter 106. Time counter 102 is associated with one or more time threshold registers (e.g., threshold registers 104a, 104b) which store threshold time counts to which time counter 102 may be set when initialized or re-initialized. Packet counter 106 is associated with one or more packet threshold registers (e.g., threshold registers 108a, 108b) which store threshold packet counts to which packet counter 106 may be set when initialized or re-initialized.

The time threshold registers and packet threshold registers depicted in FIG. 1 are implemented in programmable memory (e.g., register, RAM, flash memory). Thus, they may be set or modified by software (e.g., a device driver) operating on a host computer. As depicted in FIG. 1, multiple threshold registers may be coupled to a time and/or packet counter in order to allow the counters to be reset to different values depending on the level of network traffic. In particular, different threshold values may be desirable depending on the level of traffic received at the NIC or processed by a host processor. The time and packet counters may therefore be re-initialized to different thresholds as the traffic fluctuates. An interrupt modulator is not limited to a particular number of threshold registers and may include any number of them greater than or equal to one. In another alternative embodiment, threshold time and/or packet counts are stored in read-only memory.

Time counter 102 and packet counter 106 may be reset (e.g., initialized) to the values in a time threshold register and packet threshold register upon initialization (e.g., power on) of the NIC. They may also be reset when a host computer served by the NIC finishes processing an interrupt, as described below.

Clock signal 110 is coupled to time counter 102 and may be used for timing purposes. Time counter 102 may be decremented or incremented for each clock cycle or for a combination of cycles carried by clock signal 110. In the presently described embodiment time counter 102 is decremented for each unit of time (e.g., microsecond) signaled or indicated by clock signal 110.

Packet transfer signal 112 signals the transfer of a packet from the network interface to a host computer. Packet transfer signal 112 is thus coupled to packet counter 106 and status register 114. Packet transfer signal 112 may be generated by the NIC module that transfers the packet into host memory or some other module.

Illustratively, status register 114 is comprised of one or more status indicators. In one embodiment of the invention a status indicator may be set in response to an action, occurrence or error in the NIC. As one skilled in the art will appreciate, a PCI INTA interrupt may be generated in a previous network interface circuit each time a status register indicator is set (e.g., stores a value of one). As described herein, however, interrupt modulator 100 is designed to modulate those interrupts associated with the receipt and/or transmission of a network packet by the host. In other words, interrupts caused by the transfer of packets from a network to a host computer may be suppressed until a time or packet counter exceeds a predetermined value, but other types of interrupts may not be suppressed. In particular, one or more error conditions (e.g., incomplete packet, out of order packet, counter overrun) may be permitted to generate interrupts as usual.

Final time register 116 and final packet register 122 store final values (e.g., zero) for comparison to time counter 102 and packet counter 106 and for determining when interrupts should be enabled or re-enabled. In the illustrated embodiment of the invention these registers are programmable data storage units (e.g., RAM, flash memory).

When initialized, time counter 102 is set to the threshold value stored in time threshold register 104a (e.g., or an alternate time threshold register such as register 104b). As the time counter is decremented in response to clock signal 110, it is compared to the value in final time register 116 by comparator 118. If time counter 102 is decremented to or beyond the value in final time register 116 (e.g., indicating the passage of at least twenty microseconds of time), then time expired signal 120 is activated. The value stored in time threshold register 104a may be modified (e.g., increased) as the rate of receipt of network traffic increases. Or, as shown in FIG. 1, a different threshold value may be loaded from a different time threshold register depending upon the level of traffic (e.g., number of packets processed in an interrupt, number of packets received in a given period of time). The determination of which time threshold register's value to use for initializing time counter 102 may be made on the basis of the amount of traffic being transferred to the host computer. The value in final time register 116 may also be altered.

Similarly, when packet counter 106 is initialized, it is set to the threshold value stored in packet threshold register 108a (or an alternate packet threshold register such as register 108b). As the packet counter is decremented in response to packet transfer signal 112, it is compared to the value in final packet register 122 by comparator 124. If packet counter 106 is decremented to or beyond the value in final packet register 122, then packets exceeded signal 126 is activated. The value stored in packet threshold register 108a may be modified (e.g., increased) as the rate of receipt of network traffic increases. Or, as shown in FIG. 1, a different threshold value may be loaded from a different packet threshold register depending upon the level of traffic (e.g., number of packets processed in an interrupt, number of packets received in a given period of time). The value in final packet register 122 may also be altered.

If either time expired signal 120 or packets exceeded signal 126 is activated, OR gate 128 is enabled and interrupt enabled signal 130 of AND gate 132 is activated. The other input to AND gate 132 is provided by status register 114 and is activated when a status bit is set in response to packet transfer signal 112. Thus, interrupt signal 134 (e.g., PCI INTA) is activated only when a packet is transferred and interrupts are enabled because of the expiration of time counter 102 or packet counter 106.

In an alternative embodiment of the invention the initial and final time or packet values may be exchanged. In other words, the time threshold registers and packet threshold registers in FIG. 1 may be swapped with final time register 116 and final packet register 122, respectively. Thus, in this embodiment a time and/or packet counter is initialized to an initial value (e.g., zero) and then incremented toward a threshold value.

In the illustrated embodiment of the invention interrupt signal 134 is received by a processor (e.g., a SPARC™ processor by Sun Microsystems, Inc.) in a host computer. As one skilled in the art will recognize, status register 114 (e.g., a status register indicator corresponding to packet transfer signal 112) is cleared by the host processor when it finishes processing the interrupt signal. In response to the clearing of the status indicator, time counter 102 and packet counter 106 are re-initialized.

Resetting the time and packet counters after an interrupt is processed by a host processor allows the host processor to perform other functions and duties for what may be a significant period of time before having to process another interrupt associated with the transfer of a packet. In particular, approximately twenty microseconds must pass or approximately seven packets must be received by the NIC in this embodiment before another packet-transferred interrupt is sent to the host processor.

One skilled in the art will recognize that the interrupt modulation mechanisms and methods described in this section may be applied in communication devices other than a network interface circuit. In particular, the mechanisms and methods may be implemented in gateways, routers, bridges, modems and other communication devices that receive packets. Input and output devices, such as media controllers, may also benefit from the disclosed interrupt modulation techniques.

Figure 2:
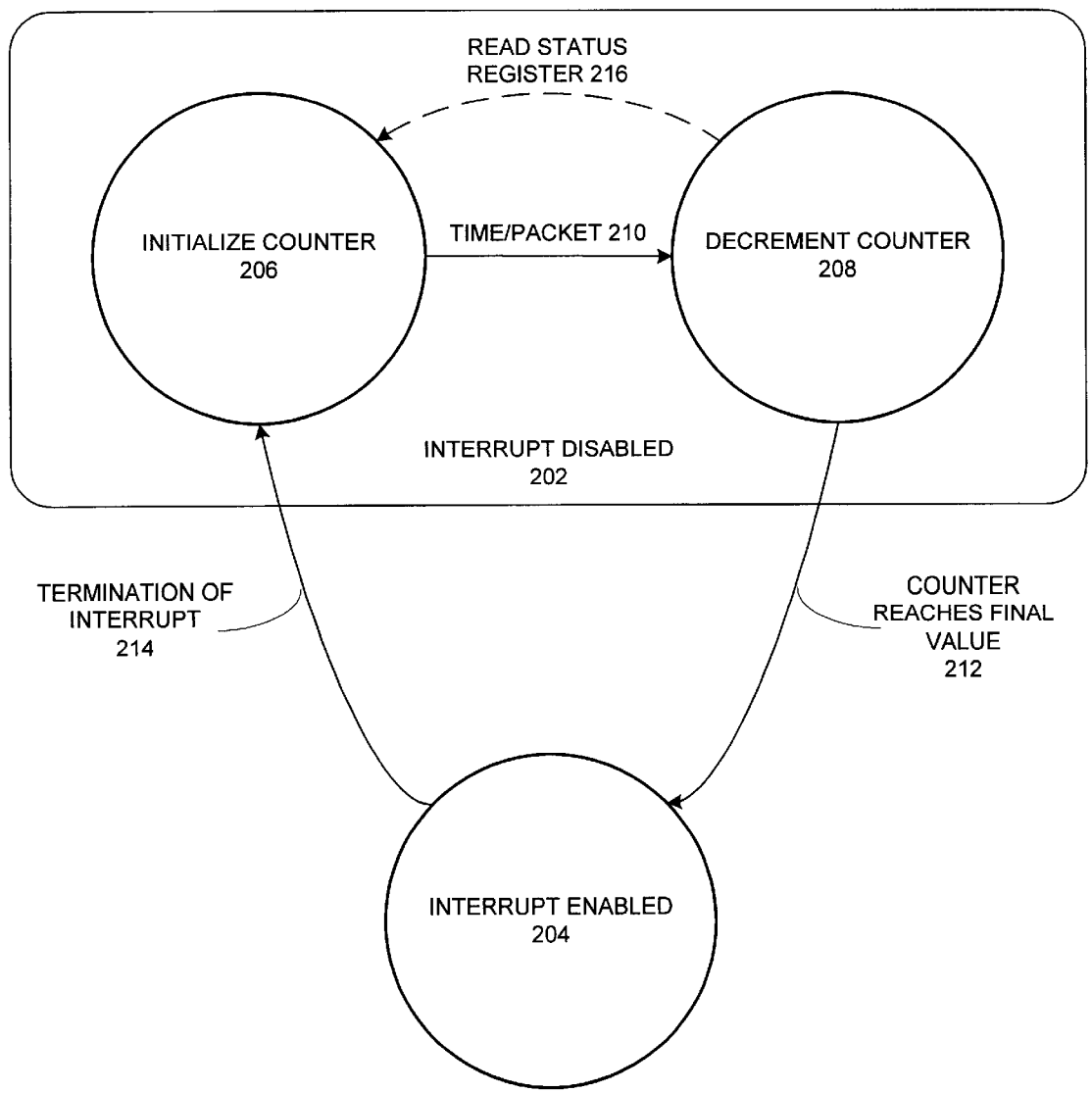
FIG. 2 is a state diagram depicting the activity of the interrupt modulator of FIG. 1 as it enables and disables interrupts in accordance with an embodiment of the invention.

FIG. 2 is a state diagram demonstrating one set of states, and transitions between such states, that may be employed in the embodiment of the invention depicted in FIG. 1. As described above, interrupts associated with the transfer of packets from a network interface may be either disabled or enabled by interrupt modulator 100. Thus, two primary states exist in FIG. 2—interrupt disabled state 202 and interrupt enabled state 204. Illustratively, in interrupt disabled state 202 an interrupt is suppressed that may otherwise be generated in response to the transfer of a packet. In interrupt enabled state 204, an interrupt that may be generated in response to the transfer of a packet is not suppressed.

Within interrupt disabled state 202, interrupt modulator 100 may either be in initialize counter state 206 or decrement counter state 208. In particular, in state 206 a counter (e.g., time counter 202 and/or packet counter 206 from FIG. 1) is initialized to an initial, or threshold, value. In decrement counter state 208, a time counter, packet counter or other counter decrements. For example, a time counter may decrement in response to a clock signal or a packet counter may decrement in response to the arrival or transfer of a packet. In an alternative embodiment of the invention in which counters increment toward threshold values rather than decrement from them, state 208 is an increment counter state.

In the illustrated embodiment of the invention interrupt modulator 100 changes from an initialize counter state to a decrement counter state via transition 210 automatically upon the storing of an initial value in a counter. Alternatively, this transition may occur in response to receipt of a time signal or receipt of a packet.

While in decrement counter state 208, the interrupt modulator may transition to interrupt enabled state 204 through transition 212. In a present embodiment of the invention transition 212 is initiated when a counter reaches a final value, as described above in conjunction with FIG. 1.

Transition 214, from interrupt enable state 204 to initialize counter state 206, may be initiated when a host processor completes processing an interrupt generated during interrupt enable state 204. In the presently described embodiment of the invention, the completion of interrupt processing may be indicated by the clearing of one or more status indicators in a status register.

Finally, in one alternative embodiment of the invention, an interrupt modulator may transition from decrement counter state 208 to initialize counter state 206 via transition 216. Transition 216 may indicate that the status register was read (e.g., because of an interrupt associated with an event other than the receipt of a packet from a network). In particular, an interrupt may be generated by the NIC because of an error condition. An interrupt service routine may then be called to handle the reported error and may also process any packets that have been received since the last interrupt. By processing any waiting packets the situation after the processing of an interrupt associated with an error condition is similar to the situation that exists after a host processor finishes processing an interrupt associated with a packet transfer. Therefore, the counter(s) maintained by the NIC may be re-initialized as though an interrupt associated with the normal transfer of a packet had just been processed.

Figure 3:
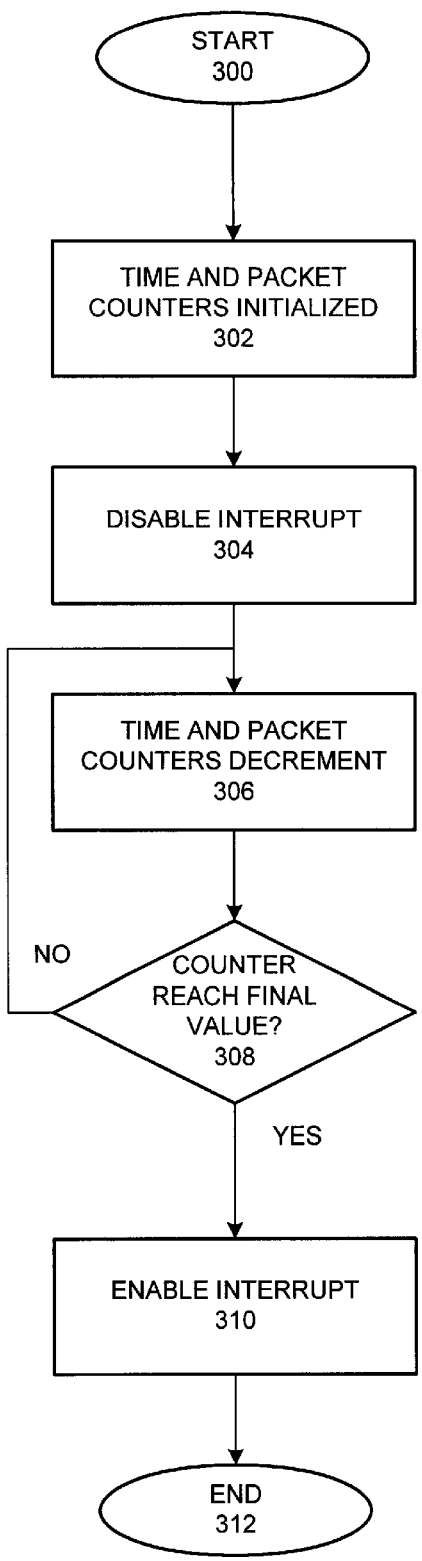
FIG. 3 is a flow chart depicting one method of operating the interrupt modulator of FIG. 1 in accordance with an embodiment of the invention.

FIG. 3 is a flow chart demonstrating one method of modulating interrupts with interrupt modulator 100. State 300 is a start state, which may correspond to the application of power to a network interface that includes interrupt modulator 100. Start state 300 may alternatively comprise the processing, by a host processor, of an interrupt generated in response to the transfer of a packet by the network interface.

In state 302, time and packet counters are initialized in response to a power-on condition or the completion of processing of an interrupt by a host processor. Illustratively, a time counter is set to twenty microseconds (or other suitable programmable time period) and a packet counter is set to seven packets (or other suitable programmable number of packets). After initialization, and as described below, the time and packet counters will decrement toward programmable final values (e.g., zero microseconds and zero packets, respectively). In one alternative embodiment of the invention time and packet counters are set to zero or other initial values in state 302 and then subsequently incremented from these values toward their threshold values.

In state 304, interrupts associated with the transfer of packets from a network interface are temporarily disabled. Certain steps toward the issuance of an interrupt may still be performed in response to the transfer of a packet, such as the setting of an indicator in a status register. As described below, however, no packet transfer interrupt will be transmitted to a host processor until either the time or packet counter reaches its threshold value.

In state 306, one or both of the time and packet counters decrement (e.g., increment negatively, or toward zero). In particular, the time counter will generally continuously decrement, from the time it is initialized, until it is re-initialized. It may, however, be halted or suspended (e.g., cease decrementing) when interrupts are enabled. After an interrupt is processed the time counter is re-initialized to a threshold value and once again begins decrementing. A packet counter, however, decrements in response to an event that is less certain than the passage of time—the transfer of a packet from the network interface. Illustratively, for each packet transferred by the network interface to a host computer the packet counter count decreases by one.

In state 308, it is determined whether one or both of the time and packet counters have reached their final values. As long as neither of the counters has reached its final value, the illustrated procedure returns to state 306 to continue decrementing the counters. Once a counter has reached its threshold, however, the procedure continues at state 310.

In state 310, interrupts associated with the transfer of network packets are enabled because one or both of the time and packet counters have reached their threshold values. Illustratively, the next packet that is transferred to the host computer will result in the transmission of an interrupt to a host processor. Alternatively, if one or more packets were received at the network interface (e.g., for transfer to the host computer) since the last interrupt, then an interrupt may be issued close in time to the beginning of state 310.

After an interrupt is issued during or following state 310, interrupt modulator 100 detects the completion of interrupt processing (e.g., by detecting the clearing of the status register indicator that was set when a packet was transferred). At this time the counters are re-initialized and the procedure continues as indicated above. The illustrated procedure ends at end state 312.

In the procedure described above, interrupts from the network interface that are associated with the transfer of packets to or from a network are modulated. Other interrupts, such as those reflecting an error condition within the network interface or an invalid packet, may still be issued as normal. In another embodiment of the invention, however, one or more interrupts other than packet arrival interrupts are also modulated.

Suppressing Interrupts During Heavy Network Traffic

In the previous section an interrupt modulator and methods of modulating interrupts for packets transferred by a network interface during moderate or comparable levels of traffic were presented. Such an interrupt modulator may use a time counter and/or a packet counter to temporarily disable and enable the generation of interrupts from the network interface to a host computer processor. As a result, the number of interrupts that are generated by the interrupt modulator and that must be serviced by the host processor may be significantly decreased. By spending less time servicing interrupts, the host processor may be more responsive to substantive tasks. Advantageously, even though an interrupt designed to signal the arrival of a packet at a host computer from a network interface may be temporarily suppressed, the modulation scheme ensures that packets are processed in a timely fashion.

As the rate of packet arrival increases, however, each time that the processor responds to an interrupt it may have more and more packets to process. Or, the rate of packet arrival at the host may be so high as to generate numerous interrupts despite the use of a time or packet counter. Either way, the benefits of interrupt modulation may be somewhat attenuated in an environment of very heavy traffic. As described previously, in one embodiment of the invention a heavy traffic environment at a network interface circuit may encompass situations in which a host processor processes approximately fifty packets each time it responds to an interrupt issued in response to the receipt of a packet.

When packets are transferred from a network interface at a very high rate, a packet counter's threshold may be quickly surmounted each time it is reset. Each time the threshold is exceeded another interrupt would then be generated to a host processor. Of course the packet counter threshold may be set to a relatively high value in response (e.g., by loading a threshold value from a different packet threshold register), but if the transfer rate remains very high then each time the processor receives an interrupt it may expend an inordinate amount of time processing a large number of packets. Some communication protocols may not be able to adequately function in such an environment. Or, if the rate of packet transfer to the host computer decreases precipitously after the packet counter threshold is increased, then the next interrupt, and the subsequent processing of one or more packets, may be delayed.

Even the use of a time counter may not alleviate the problems associated with heavy traffic levels. In particular, if the time counter has a relatively high time threshold, the number of packets transferred by a network interface before the threshold is exceeded may again require the processor to spend a significant period of time processing the packets when an interrupt is generated. If the time threshold is set to a low value (e.g., by using a different time threshold register), then the processor may be over-burdened with interrupts—similar to the result of employing a low packet counter threshold.

Thus, in heavy traffic the amount of time a host processor may spend processing packets or interrupts may degrade a host computer's responsiveness to other tasks. When the amount of network traffic (e.g., packets) received at a network interface or other communication device reaches a high level, some mechanism for alerting a host computer to the transfer of packets, other than interrupts, may be more efficient.

Therefore, in one embodiment of the invention, a polling mode of operation is enabled for a network interface or other communication device that receives a large amount of traffic (e.g., packets). In this embodiment, the network interface is regularly polled to determine if any packets have been transferred to a host computer or are ready to be processed by a host processor. If so, the packets may then be processed without incurring the overhead associated with dispatching an interrupt. However, the use of polling may be supplemented with interrupt modulation. In particular, an interrupt modulator may suppress interrupts as long as the network interface is polled on a recurring basis. If, however, polling operations are stalled or blocked, an interrupt modulator may ensure that interrupts are periodically generated so that the host processor will attend to received packets in a timely manner.

This section should therefore be understood in light of an interrupt modulator and methods of modulating interrupts described in the preceding section. Likewise, concepts introduced in this section may be applied in whole or in part to the system and methods of interrupt modulation discussed in the previous section.

As discussed previously, traffic levels in this embodiment may be defined by the number of packets that are processed each time a host processor responds to an interrupt. In particular, if approximately fifty packets are processed during an interrupt the traffic may be considered heavy. In another embodiment of the invention a measure of network traffic may consider the size and/or type of packets, not just the number of packets.

In one embodiment of the invention a network interface is repeatedly polled by software operating on a host computer (e.g., a program module or other series of computer-executable instructions). The frequency of polling may be on the order of once every 500 to 1000 microseconds. The polling software may, for example, comprise part of a device driver for the network interface. Further, it may execute as a thread on a processor such as a SPARC™ processor by Sun Microsystems, Inc. As one skilled in the art will recognize, an executable thread may be blocked on a condition variable in between polling operations.

In one embodiment the polling software may detect the transfer of a packet by examining a status register of the network interface or an indicator (e.g., bit) in the status register. Illustratively, the indicator that is checked is changed from a first state to a second state in response to the transfer of a packet and is reset to the first state after being polled.

In an embodiment of the invention in which polling is supplemented by interrupt modulation, each time the software polls the network interface an interrupt modulator is re-initialized (e.g., its time and/or packet counters are reset to threshold values). Therefore, as long as polling continues the counters are repeatedly re-initialized and any interrupts that may otherwise be generated because of the receipt of network packets are forestalled.

In particular, if the polling module is blocked a time counter or a packet counter within the interrupt modulator may reach its final value. An interrupt is then generated if any packets were transferred since the last polling operation or interrupt. The threshold values for the counters in this embodiment may be higher than the threshold values described for embodiments of the invention discussed in conjunction with FIGS. 1–3. For example, in a network environment such as the Internet, in which packets conform to the Ethernet, IP and TCP protocols, a suitable range of time thresholds is one to five milliseconds and a suitable range of packet thresholds is 500 to 2500 packets. In particular, in one embodiment of the invention a time counter threshold may be approximately two milliseconds and a packet counter threshold may be approximately one thousand.

Other values may be suitable in other embodiments of the invention and in different network or operational environments. And, threshold values may be adjusted as the amount of traffic received from a network fluctuates. As described previously, different threshold registers may store different threshold values for re-initializing time and/or packet counters during different levels of traffic.

As described above, a polling operation may be conducted by a thread or other execution module in a multi-tasking environment. A thread may, for example, be blocked on a condition variable when not polling. The thread may be released to execute, however, with a predetermined or variable (e.g., programmable) frequency, such as 1000 to 2000 times per second. The timing of each polling operation may be determined by the passage of time reflected by an interrupt modulator's time counter or a separate timer maintained by the polling software or host computer. Advantageously, the use of a thread or other process or module that can remain dormant in between polling operations avoids the processing overhead (e.g., loading, initialization, context switching) associated with a module that must be loaded into memory each time it is to execute. In one alternative embodiment, however, the polling software constitutes a series of executable instructions that are loaded and executed each time the network interface is to be polled. In other words, in this alternative embodiment the polling software terminates after each polling operation rather than simply entering a suspended state.

Polling may begin when a particular level of network traffic is detected (e.g., fifty packets are processed in a single servicing of an interrupt). As one alternative, polling may begin when a host computer processor's load reaches a particular level (e.g., ninety percent utilization).

As described above, polling software may be prevented from executing or from completing execution. If an interrupt modulator's counter reaches its final value before the polling software can finish and reset the counter, interrupts may be enabled. Interrupts may then be repeatedly disabled and enabled (as discussed in the previous section) if the polling software remains unable to execute. When the polling software recovers it may resume polling—especially if the level of network traffic is still heavy. Alternatively, the network interface may transition from a polling mode of operation to interrupt modulation if the level of network traffic has fallen. This transition may occur whenever the level of traffic falls, not just after the polling software is blocked. Alternatively, a transition from polling mode back to interrupt modulation may occur if the software polls a predetermined number of times without retrieving any packets (or less than a threshold number of packets). As part of a transition between different modes of operation, different time and/or packet thresholds from different threshold registers may be used to initialize the time and packet counters.

Figure 4:
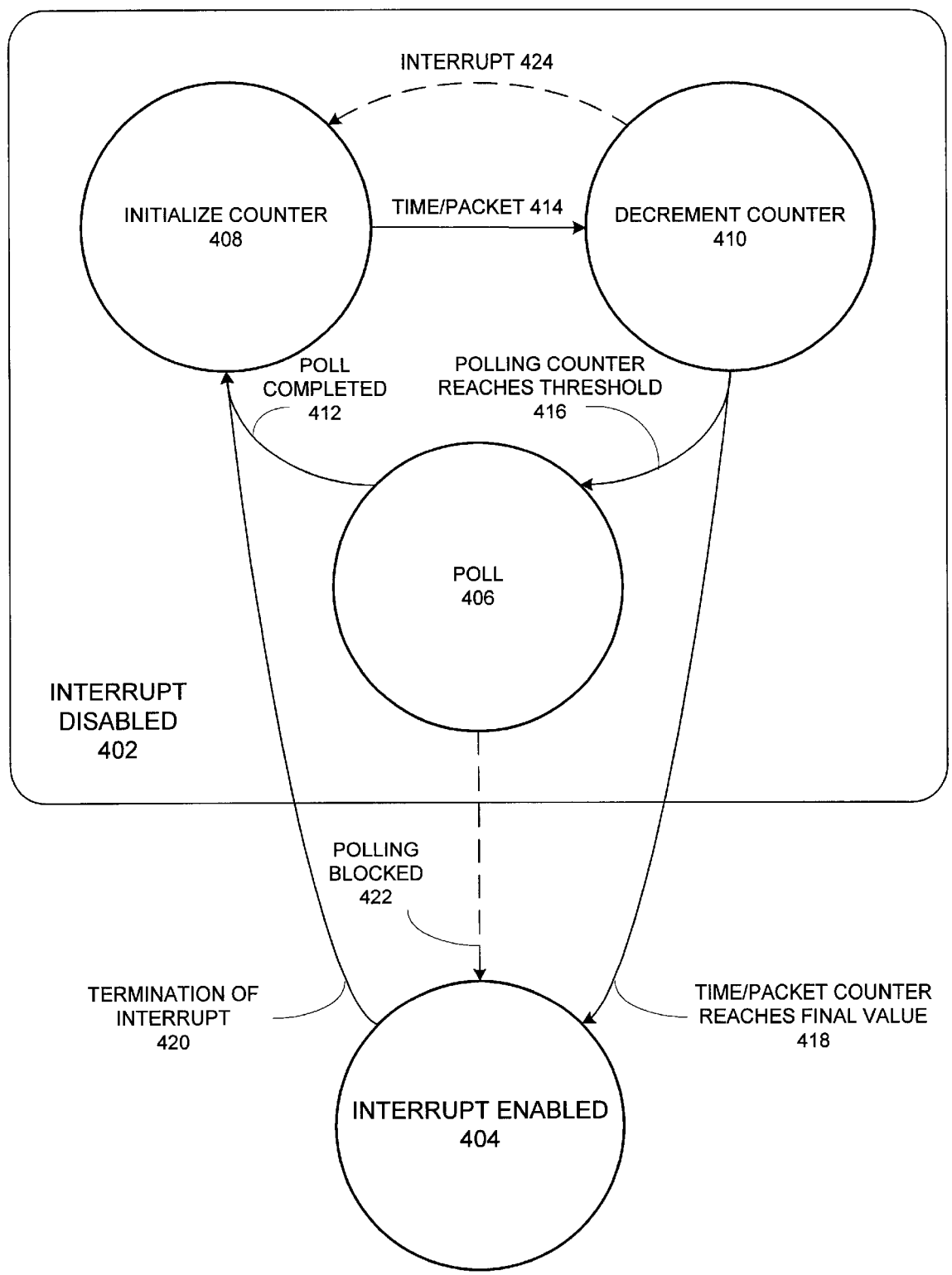
FIG. 4 is a state diagram depicting the use of polling and interrupt modulation to decrease the number of interrupts processed by a host computer in accordance with an embodiment of the invention.

FIG. 4 is a state diagram illustrating the operation of one embodiment of the invention for conducting polling operations with or without interrupt modulation. Two primary states are represented in FIG. 4—interrupt disabled state 402 and interrupt enabled state 404. It is envisioned that disabled state 402 will be the principal state for a network interface receiving a very high number of packets.

Within interrupt disabled state 402 are three sub-states, polling state 406, initialize counter state 408 and decrement counter state 410. During polling state 406, a network interface is polled to determine if any packets were transferred since the previous poll (or interrupt). In one method of polling a network interface, described in detail below, a status register of the network interface is examined by a polling module operating on a host computer. Illustratively, the status register comprises one or more indicators that change state depending on an event or condition within the network interface. One such indicator may reflect the transfer of a packet.

In initialize counter state 408, one or more counters are initialized (e.g., set to their threshold or other initial values). As described previously, the interrupt modulator may employ a time counter and/or a packet counter to determine when interrupts should be enabled (e.g., in the event that polling is blocked). Also, polling software or a host computer may maintain a separate polling timer to determine when the network interface should be polled.

In decrement counter state 410 a time and/or packet counter are decremented toward zero. In addition, a polling timer described above for timing each polling operation may be incremented or decremented (e.g., depending upon whether it is set to a threshold value or an initial value such as zero). Although time and packet counters are described as decrementing (e.g., incrementing in a negative direction from a threshold value toward zero) in the presently described embodiment, in an alternative implementation the counters are set to initial (e.g., zero) values and increment toward their threshold values.

A number of transitions are illustrated in FIG. 4 for changing from one state to another. Transition 412, from polling state 406 to initialize counter state 408 may occur after the network interface has been polled. Transition 412 may also be initiated when a polling module needs to reset a counter during a poll. For example, a large number of packets may need to be processed during one poll, thus requiring a relatively large amount of processor time. In order to fend off an interrupt that would be issued after the expiration of a counter, the polling module may suspend its operation long enough to re-initialize one or more counters.

After resetting a counter, decrement counter state 410 is entered via transition 414. Transition 414 may represent an event (e.g., receipt of a packet) that signals the need to begin counting packets or time in order to either enable interrupts or poll the network interface again. Illustratively, however, transition 414 occurs automatically upon the re-initialization of the counters.

From decrement counter state 410, polling state 406 may be entered because a polling timer expires or reaches its threshold, as represented by transition 416. A polling timer's threshold is preferably lower than the interrupt modulator's time threshold to reflect the preference for a polling operation over the generation of an interrupt. If, however, the time counter expires or reaches its final value before a polling operation can be completed (after which the time counter is re-initialized), transition 418 illustrates the entry into interrupt enabled state 404 from decrement counter state 410. Transition 418 may also be initiated by the receipt of a threshold number of packets. From interrupt enabled state 404, initialize counter state 408 is entered after an interrupt is serviced by a host processor, as indicated by transition 420.

Polling state 406 may proceed directly to interrupt enabled state 404, via transition 422, if the polling software is blocked or otherwise prevented from completing its execution. To enable this transition, the time and/or packet counters employed by an interrupt modulator may continue to decrement during polling state 406. Transition 422 may therefore be very similar to transition 418 except for the state from which the transition occurs.

Finally, in one embodiment of the invention transition 424 from decrement counter state 410 to initialize counter state 408 may occur due to the issuance of an interrupt associated with an event other than the receipt of a packet from a network (e.g., such as an error).

In one embodiment of the present invention a polling operation comprises an examination of a network interface's status register. As mentioned above and as known to those of ordinary skill in the art, a network interface may employ a status register or other data structure to signal a condition or action within the interface. A status register may, for example, comprise a number of status bits or indicators related to the receipt and/or transmission of packets by the network interface. Illustrative indicators related to packet reception include a packet transfer indicator, an overflow indicator (e.g., to indicate that a packet was dropped), one or more roll over indicators (e.g. to indicate the roll over of counters that track events such as packet receipt, CRC errors and length errors), etc. Illustrative indicators related to packet transmission include a packet transmission indicator, an underflow indicator (e.g., to indicate that an incomplete packet was dropped), a packet oversize indicator, and one or more roll over indicators (e.g., to indicate the roll over of counters tracking transmission errors). Each indicator is generally in a first state (e.g., it stores a first value, such as zero) under normal circumstances and during the NIC's inactivity and may be reset to the first state upon initialization of the network interface or some other event. An indicator may be set to a second state (e.g., store a second value, such as one) in response to a particular event or condition associated with the indicator.

For example, a packet transfer indicator may be set to its second state when a packet is received from a network and is transferred to a host computer. A packet transmission indicator may be set to a second state when a packet is transmitted from the network interface to the network. Yet another bit or indicator may be set to its second state in response to an error condition (e.g., receipt of an out-of-order packet, error in receiving a packet).

When an indicator in a status register is set to its second state, an interrupt may be automatically issued to a host processor. An interrupt service routine (ISR) is then executed by the host processor to determine the cause of the interrupt (e.g., packet transfer, packet transmission, error). The ISR may then perform some function in response to the interrupt (e.g., process a received packet through its protocol stack, execute an error recovery procedure). In a typical implementation of a status register, an indicator that causes the generation of an interrupt is returned to its first state by the interrupt service routine. Further, all of the status indicators, not just the one that caused the interrupt, are generally cleared (e.g., returned to their first state) when the ISR reads the status register.

For a network interface operating in an environment of heavy traffic, a problem associated with the claiming of interrupts may arise. Specifically, an interrupt service routine called in response to an interrupt (e.g., signaling the transfer of a packet) may find that the status register has already been cleared. The ISR thus cannot determine why the interrupt was issued. As a result, it may appear that the ISR was called by mistake and this may be interpreted as a severe error in the operation of the network interface. The network interface may then undergo re-initialization or a diagnostic routine in the hope of clearing the assumed problem. This naturally has a deleterious effect upon the processing of network traffic and the operation of the network interface.

An embodiment of the present invention that uses polling may not be immune to this problem. In particular, in a present embodiment polling software checks for the transfer of a packet by examining a status register's packet transfer indicator. Because the polling software may clear the status register or packet transfer indicator in conjunction with this examination, an ISR called in response to an interrupt caused by the packet's transfer may be too late to determine the cause of the interrupt, thus leading to some form of error recovery.

Figure 5:
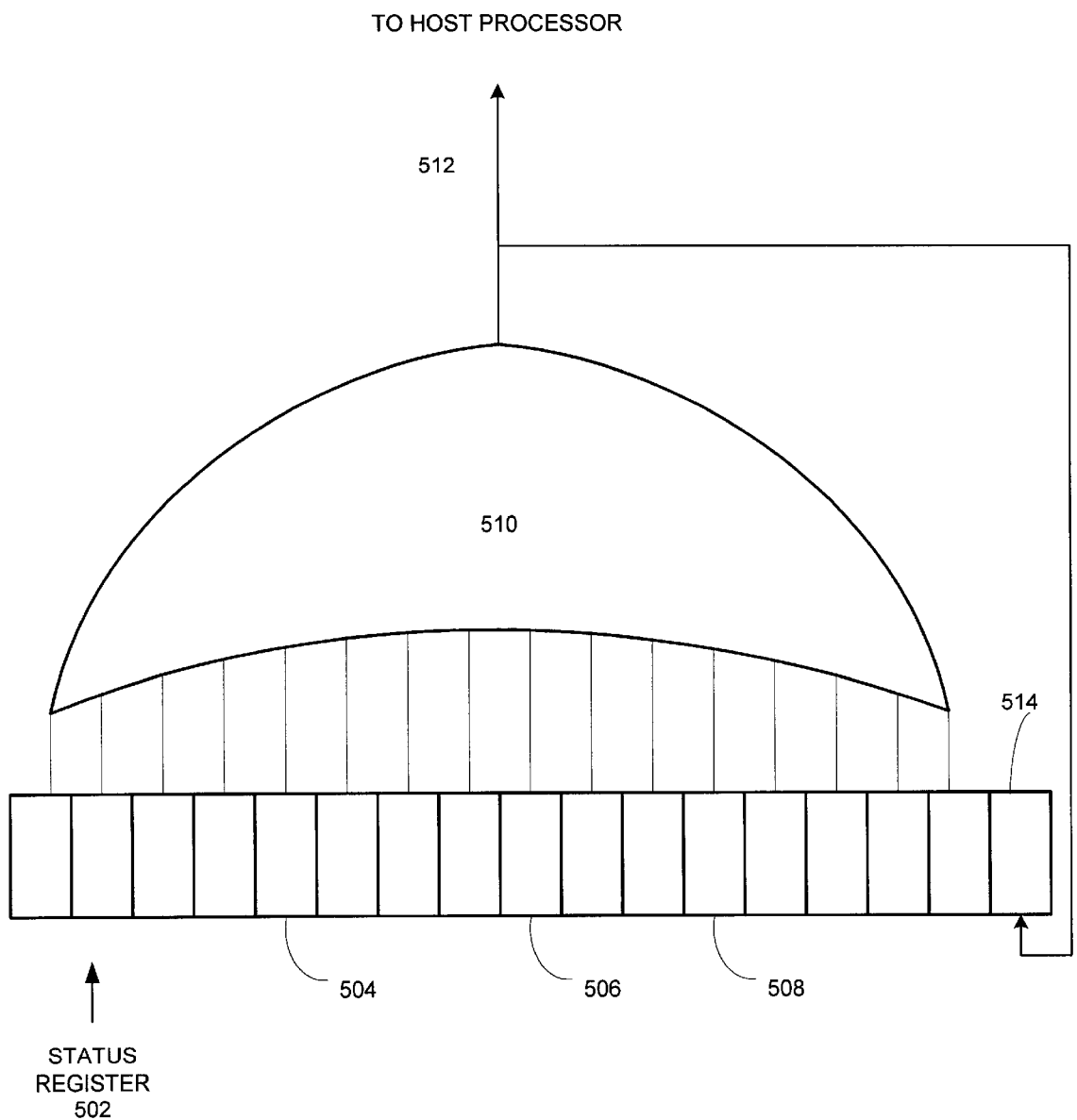
FIG. 5 is a diagram of a network interface status register for indicating the generation of an interrupt in accordance with an embodiment of the invention.

In one embodiment of the invention this "interrupt-claiming" problem may be addressed by adding an extra bit or other indicator (e.g., a feedback indicator) to the status register. FIG. 5 depicts a status register suitable for implementation in this embodiment.

In FIG. 5, status register 502 of a network interface includes packet transfer indicator 504, packet transmission indicator 506, a first error indicator 508 and ISR indicator 514. Other unlabeled indicators in status register 502 correspond to other conditions or events encountered in the network interface. Illustratively, each indicator (except, possibly, ISR indicator 514) is placed into a first state (e.g., characterized by the value zero) upon initialization and after each polling operation, and may be placed into a second state in response to its corresponding action or condition. Each indicator in the status register (other than indicator 514) is connected to the input end of OR gate 510. Illustratively, if any of the indicators coupled to OR gate 510 enters a second state (e.g., characterized by the value one), an interrupt is generated on interrupt line 512 and transmitted to a host processor or interrupt handler.

As described above, an ISR called in response to an interrupt will attempt to read status register 502 in order to determine the reason for the interrupt. However, a polling module operating on a host computer may clear the status register in conjunction with a polling operation. If the polling module clears the status register before the ISR can read the status register and determine why an interrupt was issued, a time-consuming error recovery procedure may be invoked.

Therefore, in the illustrated embodiment ISR indicator 514 has been added to status register 502 and coupled to interrupt line 512. Illustratively, ISR indicator 514 remains in a first state (e.g., characterized by the value zero) until an interrupt is issued on interrupt line 512. At that time, ISR indicator 514 transitions to a second state (e.g., characterized by the value one). An ISR indicator may thus be considered a feedback indicator or summary indicator to reflect when an interrupt has been generated due to a change in state of a component of status register 502. Significantly, however, OR gate 510 is not activated when the ISR indicator enters its second state.

During polling in the presently described embodiment of the invention, status register 502 is examined by a polling module to determine whether a packet has been transferred by the network interface. When the software examines the register it may clear or zero one or more status indicators (e.g., return them to their first state), just like an ISR would. If an interrupt had been generated (e.g., because of an error condition indicated by error indicator 508) shortly before the interface is polled, the polling software may clear the status register before an interrupt handler can determine the reason for being called. Therefore, in the illustrated embodiment of the invention the interrupt handler can examine ISR indicator 514 and thus determine that there was a valid interrupt and that it need not re-initialize the network interface or perform an error recovery procedure. The ISR will typically clear the status register, possibly including ISR indicator 514, after examining the register.

In one embodiment of the invention the polling module is specifically configured to avoid clearing ISR indicator 514 (e.g., returning it to zero) when polling status register 502. Illustratively, ISR indicator 514 is cleared via a write operation from the host computer that may be conducted in response to a particular event, such as the invocation of an interrupt service routine in response to an interrupt. Thus, the polling module may clear other indicators in the status register during a poll but the ISR indicator is cleared separately. In another embodiment of the operation, discussed immediately below in conjunction with FIG. 6, indicators within status register 502 are selectively cleared through the use of a virtual or alias status register. In this implementation a separate write operation to clear an ISR indicator is unnecessary.

Figure 6:
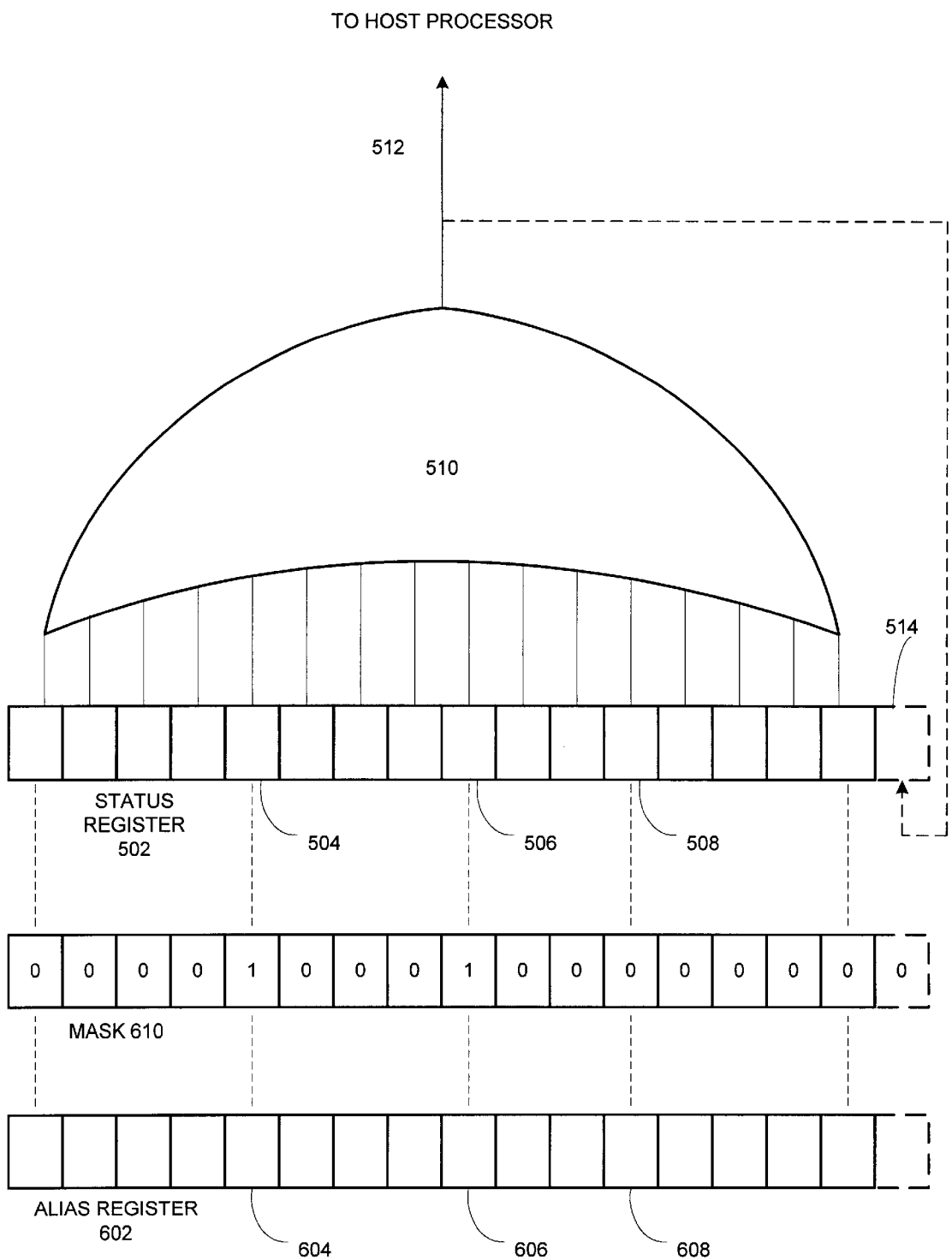
FIG. 6 is a diagram of an alias register and mask for use with a network interface status register to decrease the number of interrupts processed by a host computer in accordance with an embodiment of the invention.

FIG. 6 illustrates one enhancement to the embodiment of the invention depicted in FIG. 5. In this enhancement an alias register is associated with the status register. The alias register in the illustrated embodiment is essentially the status register, but is accessed through a different address. Thus, the alias register mirrors or mimics the status register in that each time a bit or indicator in the status register is set or cleared the corresponding bit or indicator in the alias register is set to the same state. However, clearing an indicator in the alias register (e.g., by clearing the alias register) does not necessarily clear the corresponding status register indicator. Instead, a mask is used to allow status register indicators to be selectively cleared. Thus, in one particular embodiment of the invention the alias register is a "virtual" register providing an alternative yet traceable path to the status register.

In the illustrated embodiment of the invention, instead of examining (e.g., reading) the status register to determine if a packet has arrived, the polling software examines the alias register. Each time the alias register is examined by the polling software one or more alias register indicators may be returned to their first state (e.g., the alias register is cleared when read). In addition, a mask is applied to determine which status register indicators are cleared when the alias register is cleared. Illustratively, the mask has an entry for every bit or indicator the status register—and thus also has an entry for every indicator in the alias register. The value stored in each mask entry indicates whether or not the corresponding status register indicator should be cleared (e.g., returned to a value of zero) when the associated alias register indicator is cleared. A first value (e.g., one) in a mask entry indicates that the corresponding status register bit should be cleared; a second value (e.g., zero) indicates that it should not.

One skilled in the art will appreciate the benefit of employing an alias register and masking it from the status register. In particular, as a result of this configuration the polling software that reads the alias register only needs to be configured to handle events associated with the status register indicators that it clears. Where, for example, the polling software only handles packet transfer events, and therefore only clears a packet transfer indicator in the status register, the software need not be configured to handle other events or conditions. By contrast, in an embodiment of the invention without an alias register the polling software will clear all status register indicators and thus may need to be capable of handling all associated errors or conditions reported by those indicators.

With reference now to FIG. 6, status register 502 is configured as described in conjunction with FIG. 5. ISR indicator 514 is optional, however, in the presently illustrated embodiment.

Alias register 602 is equivalent in size to status register 502, with the possible exception that alias ISR indicator 614, a counterpart to ISR indicator 514, may be omitted. Thus, packet transfer indicator 604, packet transmission indicator 606 and a first error indicator 608 in alias register 602 correspond to similar entries in status register 502.

Although each indicator in alias register 602 changes state to match its counterpart in status register 502 whenever that counterpart changes, mask 610 filters the reverse action when alias register 602 is cleared. In particular, when one or more alias indicators in alias register 602 are cleared (e.g., in response to being polled), only the specified indicators in status register 502 are cleared. In the illustrated implementation mask 610 stores a one for each indicator in the status register that clears with the alias register. Thus, in FIG. 6, when alias register 602 is cleared (e.g., when it is read by the polling module), only packet transfer indicator 504 and packet transmission indicator 506 will be cleared in status register 502. The remaining indicators maintain their current states.

In one embodiment in which an ISR indicator is used in addition to an alias register and a mask, the mask entry corresponding to the ISR indicator will store a value (e.g., zero) indicating that the ISR indicator in the status register is not to be cleared when the alias register is cleared.

The programmable mask (which may be implemented in a register or other data structure) may be configured by software operating on the host computer. In particular, the setting of each mask entry may be determined in accordance with those actions handled by the software. For example, in an embodiment in which the software only handles "normal" events—such as the transfer or transmission of a packet— the mask may be configured to clear only the corresponding indicator(s) in a status register when the alias register is read. In alternative embodiments the polling software may handle virtually any condition or event associated with a status register indicator.

Although alias register 602 in FIG. 6 is a virtual register for accessing status register 502 in the illustrated embodiment, when the status register is read it can be determined whether the status register was accessed directly (i.e., as status register 502) or indirectly (i.e., through alias register 602). As one skilled in the art will recognize, examining the address associated with the access will reveal whether the status register is being accessed directly or through its alias.

Illustratively, the status register is accessed through an alias register (e.g., alias address) during heavy levels of network traffic (e.g., when a polling mode of operation is active). Otherwise, the status register may be accessed directly. In addition, it was described above that different threshold values for time and/or packet counters in an interrupt modulator may be desirable for different levels of traffic. Therefore, in an embodiment of the invention in which an interrupt modulator stores multiple time and/or packet threshold values (e.g., in separate threshold registers), the threshold value that is loaded into a counter may be determined by how the status register is accessed.

In particular, during a less-than-heavy level of traffic (e.g., when less than approximately fifty packets are processed during an interrupt), status register 502 may be accessed directly. Each time it is cleared a first time threshold value and/or packet threshold value is loaded into the time and packet counters. When the traffic becomes heavy and an alias register is implemented, each time the alias register is cleared a second time threshold value and/or packet threshold value is loaded into the time and packet counters.

Figure 7:
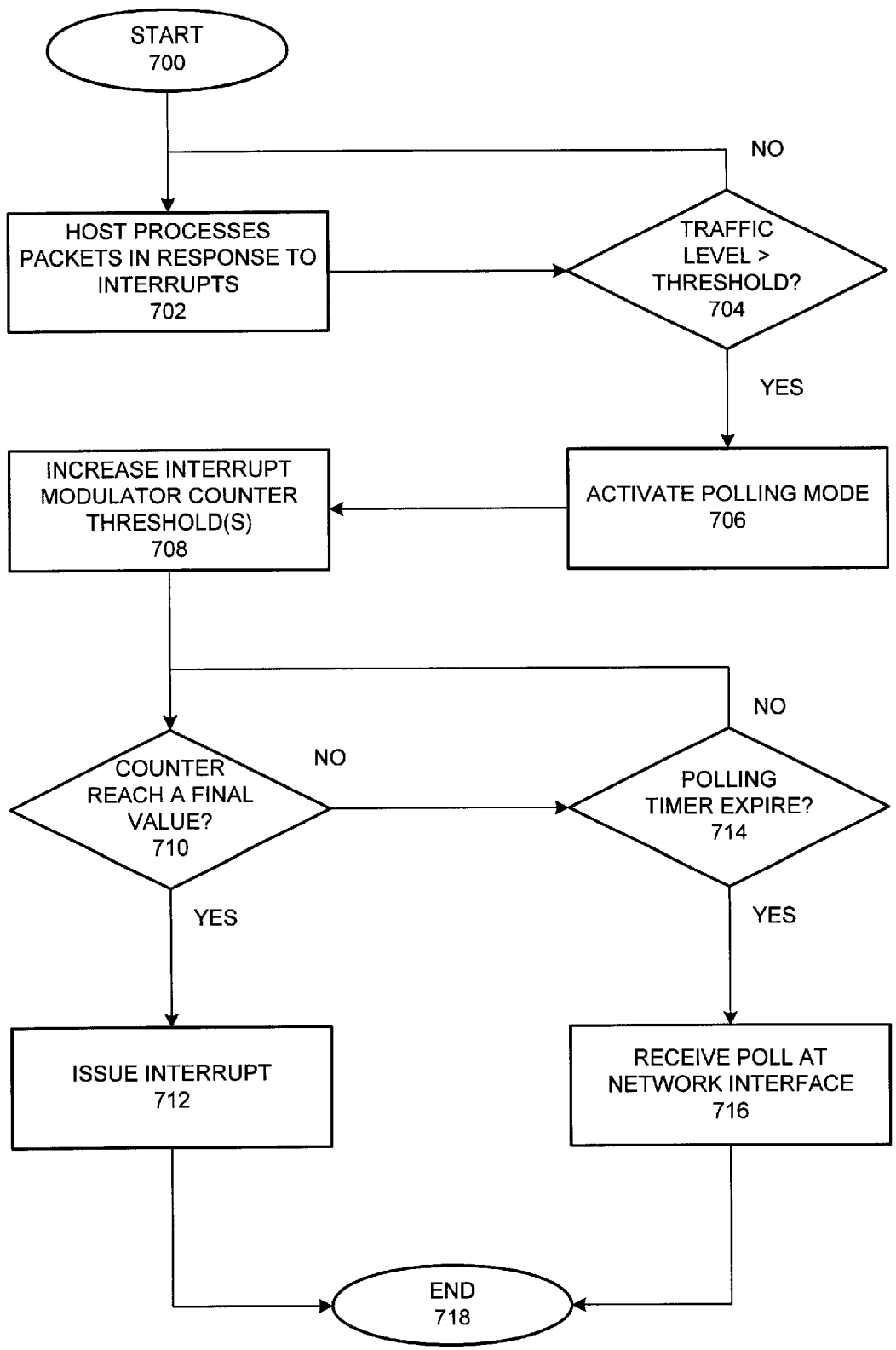
FIG. 7 is a flow chart demonstrating one method of decreasing the number of packet transfer interrupts processed by a host computer through polling and interrupt modulation in accordance with an embodiment of the invention.

FIG. 7 is a flow chart depicting one method of employing polling and interrupt modulation to suppress the generation of interrupts by a network interface without significantly delaying the processing of packets received from a network. In the illustrated procedure a network interface transitions from an interrupt mode of operation to a polling mode. State 700 is a start state.

In state 702, an interrupt mode of operation is active. In this mode of operation packets from a network are processed by a host computer processor in response to interrupts generated from the network interface. The rate at which interrupts are generated, however, may be modulated as described above. If, for example, a moderate level of traffic is being received at the network interface, a method of interrupt modulation described in the previous section may be employed.

In state 704, it is determined whether the level of traffic or rate of interrupts or some other traffic measure indicates that it would be more efficient to implement a polling mode of operation. For example, it may be determined that the number of packets processed during an interrupt exceeds a programmable threshold (e.g., fifty). Other criteria for making this determination include the rate at which interrupts are issued by the network interface for packets transferred to the host (e.g., approximately 10,000 per second) or the level of processor utilization (e.g., approximately ninety percent). These thresholds may be measured on a one-time or instantaneous basis, or may be averaged or otherwise combined over a period of time or a number of interrupts. The illustrated procedure returns to state 702 if an applicable threshold is not met.

In state 706 a polling mode of operation is initiated. In one embodiment of the invention a polling module is activated, or loaded for execution, by a host computer processor. Illustratively, the polling module or thread resides in host computer memory and, as described below, is periodically activated to poll the network interface to determine if any packets have been received from the network interface. If so, the module processes the packets before returning to a suspended mode.

In state 708 thresholds for one or more interrupt modulator counters (e.g., a time and/or packet counter) are set or increased from lower values used during interrupt modulation. The counters are activated and thereafter decrement or increment as described previously. By increasing the thresholds, any interrupts that may be issued by the interrupt modulator are issued with less frequency, if at all. Delaying interrupts allows the polling module to perform its polling and packet processing and allows a host processor to avoid the overhead involved in servicing an interrupt.

In this embodiment an interrupt modulator may store multiple threshold values in multiple registers for a packet and/or a time counter in order to facilitate the modification of counter thresholds. With multiple threshold registers, the counters may be easily re-initialized or switched to use different thresholds. In particular, when operating in a moderate level of network traffic (e.g., without using an alias register) a packet or time counter may be re-initialized to a first threshold every time a status register is cleared (e.g., because of an interrupt). However, when operating in a heavier traffic environment characterized by the use of polling and, possibly, an alias register, a counter may be re-initialized to a second threshold when the alias register is read by the polling software.

In state 710, a time or packet counter is examined to determine if it expired or reached its limit (e.g., zero). If so, then in state 712 an interrupt is issued to inform a host processor that a packet awaits its attention if a packet was transferred since the last poll or interrupt. The illustrated procedure then ends with end state 718.

If no counter expired in state 710, then a polling timer is examined in state 714. If the polling timer expired or indicates that it is time for a polling operation, the polling module polls the network interface in state 716 and processes any waiting packets. The polling timer may or may not be separate from an interrupt modulator's time counter.

State 710 demonstrates that if an interrupt modulator reaches a threshold value, the network interface will not continue waiting for a polling operation. In one alternative embodiment a polling timer may be examined more frequently than a packet or time counter. In other words, states 710–712 and 714–716 may be reversed, such that the interrupt modulator's counters are only examined when it is determined that it is not time for a polling operation.

After state 712 or state 716 the illustrated procedure ends at state 718. The illustrated procedure thus depicts only one poll or interrupt. In one embodiment of the invention, however, end state 718 is replaced by a test of whether an interrupt mode should be resumed. If so, counter thresholds may be reset (e.g., decreased—possibly to values held in different threshold registers) and the procedure returned to state 702. If not, the procedure returns to state 710 or, if a counter needs to be adjusted, to state 708. As described above, the test for determining whether an interrupt mode of operation should be resumed may entail examining the level of network traffic, the rate of packet arrival or transfer, the number of packets processed during an interrupt, the level of processor utilization or some other measure. In particular, if the network interface is polled a predetermined number of times without detecting the transfer of a packet, an interrupt mode of operation may be adopted.

In order to implement the embodiments described above, software operating on a host computer (e.g., a device driver) may require modification. In particular, the software may be altered to maintain a timer to determine when the software should poll the network interface. In addition, the software may be modified to examine (and clear) an alias register instead of a status register.

During polling in a heavy traffic environment the software may have many packets to process each time it examines a network interface's status register or alias register. In order to prevent an interrupt modulator's counter from reaching its threshold during the processing of the packets, the polling software may temporarily pause, suspend or interrupt operation in order to re-initialize the counter(s). For example, if an interrupt modulator's time counter is set to one millisecond, the polling software will attempt to ensure that it re-initializes the time counter less than one millisecond after it was last re-initialized. The polling software may examine the time counter, its own counter, or another counter or clock signal in order to determine when it should re-initialize a counter.

Illustratively, the threshold for an interrupt modulator's time counter is determined, at least in part, by the amount of time that the polling software is expected to need in order to process an expected amount of traffic. The time counter threshold, and the frequency of polling, may also be affected by the speed of a host computer processor.

In one embodiment of the invention in which an interrupt modulator is used to control the number of interrupts issued to a host processor, an interrupt mask may be associated with the status register. An interrupt mask is distinct from the alias register mask described previously. In particular, an interrupt mask may contain an entry for each status register indicator, and each entry's value indicates whether or not an interrupt is generated when the indicator changes from a first state to a second state. Therefore, an interrupt mask could be logically visualized in position between status register 502 and OR gate 510 in FIG. 5. Depending upon a particular operating environment, an interrupt mask may or may not be used in the embodiments of the invention described above.

Sun, Sun Microsystems, SPARC and Solaris are trademarks or registered trademarks of Sun Microsystems, Incorporated, in the United States and other countries.

The foregoing descriptions of embodiments of the invention have been presented for purposes of illustration and description only. They are not intended to be exhaustive or to limit the invention to the forms disclosed. Many modifications and variations will be apparent to practitioners skilled in the art. Accordingly, the above disclosure is not intended to limit the invention; the scope of the invention is defined by the appended claims.

What is claimed is:

1. A method of controlling the generation of interrupts from a communication device, comprising:
   operating a communication device in an interrupt mode until a rate of information transfer from said communication device reaches a first level, wherein a host computer identifies a transfer of a first packet of information in said interrupt mode by receiving an interrupt generated by said communication device;
   operating said communication device in a polling mode after said first level of information transfer is detected, wherein said host computer identifies a transfer of a second packet of information in said polling mode by polling said communication device;
   returning said communication device to said interrupt mode of operation if a rate of information transfer decreases to a second level; and
   returning said communication device to said interrupt mode of operation if a predetermined length of time passes without said communication device receiving a poll from said host computer.

2. The method of claim 1, further comprising returning said communication device to said interrupt mode of operation if a predetermined amount of information is transferred from said communication device without said communication device receiving a poll from said host computer.

3. The method of claim 1, further comprising returning said communication device to said interrupt mode if said communication device receives a predetermined number of polls without detecting the transfer of a packet of information.

4. The method of claim 1, wherein said operating a communication device in an interrupt mode comprises:
   transferring a first packet of information from said communication device;
   generating a first packet-transferred interrupt to a host computer from said communication device;
   initializing a time counter in response to completion of processing of said first packet-transferred interrupt by said host computer, wherein said time counter is configured to increment through a first range of time counts after said initializing;
   initializing a packet counter in response to said completion of processing of said first packet-transferred interrupt by said host computer, wherein said packet counter is configured to increment through a first range of packet counts after said initializing; and
   if either said time counter is incremented to a first final time count or said packet counter is incremented to a first final packet count, issuing another packet-transferred interrupt to said host computer in response to transfer of another packet.

5. The method of claim 4, wherein said initializing a time counter comprises setting said time counter to a first initial time count.

6. The method of claim 5, wherein said initializing a packet counter comprises setting said packet counter to a first initial packet count.

7. The method of claim 4, wherein said operating said communication device in a polling mode comprises:
   receiving a poll from a polling module operating on said host computer, wherein said poll comprises an examination of said communication device to determine if a packet of information has been transferred from said communication device;
   re-initializing said time counter in response to said poll, wherein said time counter is configured to increment through a second range of time counts after said re-initializing; and
   re-initializing said packet counter in response to said poll, wherein said packet counter is configured to increment through a second range of packet counts after said re-initializing.

8. The method of claim 7, wherein said polling mode further comprises:
   transferring a second packet; and
   if either said time counter is incremented to a second final time count or said packet counter is incremented to a second final packet count, issuing a second packet-transferred interrupt to said host computer in response to said transfer of said second packet.

9. The method of claim 7, wherein said initializing said time counter in response to said poll comprises setting said time counter to a second initial time count.

10. The method of claim 9 wherein said initializing said packet counter in response to said poll comprises setting said packet counter to a second initial packet count.

11. The method of claim 10, further comprising:
   storing said first initial time count in a first time threshold storage device;
   storing said second initial time count in a second time threshold storage device;
   storing said first initial packet count in a first packet threshold storage device; and storing said second initial packet count in a second packet threshold storage device.

12. The method of claim 7, wherein said second range of time counts is larger than said first range of time counts and said second range of packet counts is larger than said first range of time counts.

13. The method of claim 1, wherein said operating said communication device in a polling mode comprises:

examining a set of alias indicators in said communication device, wherein each of said alias indicators is configured to change from a first state to a second state in association with a corresponding status indicator in a set of status indicators;

altering one or more of said alias indicators from said second state to said first state; and selectively altering one or more of said status indicators from said second state to said first state.

14. The method of claim 13, wherein said set of status indicators includes a packet-transferred indicator configured to change from said first state to said second state in response to said transfer of said second packet from said communication device.

15. The method of claim 1, wherein said communication device is a network interface.

16. A method of facilitating polling of a communication device, comprising:

maintaining a set of status indicators, including a packet-transferred indicator configured to change from a first state to a second state in response to transfer of a packet from a communication device;

maintaining a set of alias indicators, including an alias packet-transferred indicator configured to change from said first state to said second state when said packet-transferred indicator changes from said first state to said second state;

transferring a first packet from said communication device;

altering said packet-transferred indicator from said first state to said second state;

receiving a poll at said communication device from a polling module of a host computer, wherein said polling module is configured to poll said communication device to determine if a packet has been transferred;

returning said alias packet-transferred indicator from said second state to said first state; and selectively returning one or more of said status indicators from said second state to said first state, including said packet-transferred indicator.

17. The method of claim 16, further comprising disabling issuance of a packet-transferred interrupt from said communication device, wherein said packet-transferred interrupt is normally issued in response to transfer of a packet.

18. The method of claim 17, further comprising:

enabling said issuance of a packet-transferred interrupt if a predetermined period of time has elapsed after said returning said alias packet-transferred indicator or said selectively returning said packet-transferred indicator; and enabling said issuance of a packet-transferred interrupt if a predetermined number of packets have been transferred from said communication device after said returning said alias packet-transferred indicator or said selectively returning said packet-transferred indicator.

19. The method of claim 17, wherein said disabling comprises initializing a time counter to hold an initial time count, wherein said time counter is configured for incrementing said time count toward a final time count after said initializing.

20. The method of claim 19, wherein said initial time count comprises a first time threshold value stored in a first time threshold storage device and said incrementing comprises incrementing said time count toward zero from said first time threshold.

21. The method of claim 17, wherein said disabling comprises initializing a packet counter to hold an initial packet count, wherein said packet counter is configured for incrementing said packet count toward a final packet count after said initializing.

22. The method of claim 21, wherein said initial packet count comprises a first packet threshold value stored in a first packet threshold storage device and said incrementing comprises incrementing said packet count toward zero.

23. The method of claim 16, wherein said poll comprises examining said set of alias indicators.

24. The method of claim 16, wherein said selectively returning comprises applying a mask, said mask comprising a mask indicator configured to indicate whether a predetermined status indicator is to be altered from said second state to said first state when a corresponding alias indicator is altered from said second state to said first state.

25. The method of claim 16, further comprising:

initializing a time count to a first threshold time count stored in a first time threshold storage device associated with a first level of traffic transferred from said communication device, wherein said time count is configured to decrement after said initializing; and initializing a packet count to a first threshold packet count stored in a first packet threshold storage device associated with a first level of traffic transferred from said communication device, wherein said packet count is configured to decrement after said initializing;

wherein an interrupt normally issued in response to transfer of a packet from said communication device is suppressed unless said time count reaches a final time count or said packet count reaches a final packet count.

26. The method of claim 25, further comprising:

re-initializing said time count to a second threshold time count stored in a second time threshold storage device associated with a second level of traffic transferred from said communication device, wherein said time count is configured to decrement after said re-initializing; and re-initializing said packet count to a second threshold packet count stored in a second packet threshold storage device associated with a second level of traffic transferred from said communication device, wherein said packet count is configured to decrement after said re-initializing.

27. The method of claim 16, wherein said returning said alias packet-transferred indicator comprises clearing said set of alias indicators.

28. The method of claim 16, wherein said communication device is a network interface.

29. An interrupt modulator for controlling the generation of interrupts from a communication device, comprising:

an indicator configured to indicate the transfer of a packet from a communication device, wherein said indicator is set from a first state to a second state in response to said transfer of said packet and is reset to said first state when a poll is received;

a first time threshold storage device configured to store a first initial time count;

a second time threshold storage device configured to store a second initial time count;

a time counter configured to store a time count, wherein said time count is incrementable in response to a clock signal; and an interrupt generator configured to generate an interrupt in response to said transfer of a packet if said time count reaches a final time count;

wherein said time count is reset to one of said first initial time count and said second initial time count in response to said poll or a termination of processing of said interrupt.

30. The interrupt modulator of claim 29, further comprising:

a first packet threshold storage device configured to store a first initial packet count;

a second packet threshold storage device configured to store a second initial packet count;

a packet counter configured to hold a packet count, wherein said packet count is incrementable in response to transfer of packets;

wherein said interrupt generator is further configured to generate an interrupt in response to said transfer of said packet if said packet count reaches a final packet count; and wherein said packet count is reset to one of said first initial packet count and said second initial packet count in response to said poll or said termination of processing of said interrupt.

31. The interrupt modulator of claim 29, wherein said indicator comprises a packet-transferred indicator of a status module, said status module comprising a set of indicators that change from said first state to said second state in response to predetermined events.

32. The interrupt modulator of claim 29, wherein said indicator is a status module comprising a packet-transferred indicator configured to enter a second state from a first state in response to the transfer of a packet.

33. The interrupt modulator of claim 29, wherein said indicator comprises an alias packet-transferred indicator of an alias module, wherein said alias module comprises a set of virtual indicators configured to change from said first state to said second state when corresponding indicators in a status module change from said first state to said second state.

34. The interrupt modulator of claim 29, wherein said indicator is an alias module comprising an alias packet-transferred indicator configured to change from said first state to said second state when a packet-transferred indicator of a set of status indicators changes from said first state to said second state.

35. The interrupt modulator of claim 33, further comprising a mask, said mask comprising a set of entries corresponding to said virtual indicators and said status module indicators, and wherein a status module indicator changes state when a corresponding virtual indicator changes state if said corresponding entry in said mask is set to a predetermined value.

36. The interrupt modulator of claim 29, further comprising:

a set of status indicators configured to change from a first status state to a second status state in response to predetermined conditions in said communication device, wherein said set of status indicators includes said indicator;

a set of virtual status indicators, wherein each of said virtual status indicators is configured to change from said first status state to said second status state when a corresponding status indicator in said set of status indicators changes from said first status state to said second status state; and a set of return indicators, wherein each of said return indicators is configured to selectively indicate whether a predetermined status indicator in said set of status indicators is to be returned to said first status state when a corresponding virtual status indicator in said set of virtual status indicators returns to said first status state;

wherein one or more of said set of virtual status indicators are returned from said second status state to said first status state when said poll is received.

37. The interrupt modulator of claim 29, wherein said poll is received from a polling module of a host computer.

38. The interrupt modulator of claim 29, wherein said communication device is a network interface.

39. A computer system for receiving packets from a network, comprising:

a packet-transferred indicator configured to indicate a transfer of a first packet from a network interface, wherein said packet-transferred indicator changes from a first state to a second state in response to transfer of said packet;

an alias packet-transferred indicator configured to change from said first state to said second state when said packet-transferred indicator changes from said first state to said second state;

a polling module for polling said alias packet-transferred indicator to determine if a packet has been transferred;

a time counter configured to store a time count, wherein said time count is initialized to an initial time count when said polling module polls said alias packet-transferred indicator, and thereafter increments toward a final time count;

a packet counter configured to store a packet count, wherein said packet count is initialized to an initial packet count when said polling module polls said alias packet-transferred indicator, and thereafter increments toward a final packet count;

an interrupt generator configured to generate an interrupt signal in response to a transfer of a packet from said network interface if said time count reaches said final time count or said packet count reaches said final packet count; and a mask for selectively determining whether said packet-transferred indicator is returned to said first state when said alias packet-transferred indicator is returned to said first state;

wherein said alias packet-transferred indicator is returned from said second state to said first state when polled by said polling module.

40. A method of polling a network interface to detect the transfer of a packet from a network interface, comprising:

periodically polling a network interface to determine if a packet has been transferred from said network interface, wherein said polling comprises:

examining an alias indicator of said network interface to determine if said alias indicator is in a second state, wherein said alias indicator enters said second state from a first state when a packet-transferred indicator in said network interface changes from said first state to said second state in response to transfer of a packet from said network interface; and returning said alias indicator to said first state from said second state; and receiving an interrupt from said network interface if a predetermined amount of time passes or a predetermined number of packets are transferred from said network interface after a first poll;

wherein interrupts from said network interface associated with the transfer of packets are suppressed during said periodic polling.

41. The method of claim 40, wherein said polling further comprises:

selectively returning said packet-transferred indicator to said first state from said second state.

42. The method of claim 40, wherein said polling further comprises:

processing one or more packets transferred from said network interface; and suspending said processing prior to completion of processing of a number of packets transferred from said network interface since a prior poll;

wherein said suspension of processing prevents said passing of said predetermined amount of time.

43. The method of claim 40, further comprising:

prior to said periodically polling, determining whether a level of traffic transferred from said network interface has reached a first level; and if a level of traffic transferred from said network interface decreases from said first level to a second level during said periodic polling, halting said periodic polling.

44. A computer readable storage medium storing instructions that, when executed by a computer, cause the computer to perform a method of polling a network interface to detect the transfer of a packet from a network interface, the method comprising:

periodically polling a network interface to determine if a packet has been transferred from said network interface, wherein said polling comprises:

examining an alias indicator of said network interface to determine if said alias indicator is in a second state, wherein said alias indicator enters said second state from a first state when a packet-transferred indicator in said network interface changes from said first state to said second state in response to transfer of a packet from said network interface; and returning said alias indicator to said first state from said second state; and receiving an interrupt from said network interface if a predetermined amount of time passes or a predetermined number of packets are transferred from said network interface after a first poll;

wherein interrupts from said network interface associated with the transfer of packets are suppressed during said periodic polling.

45. A computer readable storage medium storing instructions that, when executed by a computer, cause the computer to perform a method of controlling the generation of interrupts from a communication device, the method comprising:

operating a communication device in an interrupt mode until a rate of information transfer from said communication device reaches a first level, wherein a host computer identifies a transfer of a first packet of information in said interrupt mode by receiving an interrupt generated by said communication device;

operating said communication device in a polling mode after said first level of information transfer is detected, wherein said host computer identifies a transfer of a second packet of information in said polling mode by polling said communication device;

returning said communication device to said interrupt mode of operation if a rate of information transfer decreases to a second level; and returning said communication device to said interrupt mode of operation if a predetermined length of time passes without said communication device receiving a poll from said host computer.

46. A computer readable storage medium storing instructions that, when executed by a computer, cause the computer to perform a method of facilitating polling of a communication device, the method comprising:

maintaining a set of status indicators, including a packet-transferred indicator configured to change from a first state to a second state in response to transfer of a packet from a communication device;

maintaining a set of alias indicators, including an alias packet-transferred indicator configured to change from said first state to said second state when said packet-transferred indicator changes from said first state to said second state;

transferring a first packet from said communication device;

altering said packet-transferred indicator from said first state to said second state;

receiving a poll at said communication device from a polling module of a host computer, wherein said polling module is configured to poll said communication device to determine if a packet has been transferred;

returning said alias packet-transferred indicator from said second state to said first state; and selectively returning one or more of said status indicators from said second state to said first state, including said packet-transferred indicator.

47. An interrupt modulator for controlling the generation of interrupts from a communication device, comprising:

an indicator configured to indicate the transfer of a packet from a communication device, wherein said indicator is set from a first state to a second state in response to said transfer of said packet;

a first packet threshold storage device configured to store a first initial packet count;

a second packet threshold storage device configured to store a second initial packet count;

a packet counter configured to hold a packet count, wherein said packet count is incrementable in response to transfer of packets;

an interrupt generator configured to generate an interrupt in response to said transfer of said packet if said packet count reaches a final packet count;

wherein said packet count is reset to one of said first initial packet count and said second initial packet count in response to a poll or a termination of processing of said interrupt.

48. The interrupt modulator of claim 47, wherein said indicator is a status module comprising a packet-transferred indicator configured to enter a second state from a first state in response to the transfer of a packet.

49. The interrupt modulator of claim 47, wherein said indicator comprises an alias packet-transferred indicator of an alias module, wherein said alias module comprises a set of virtual indicators configured to change from said first state to said second state when corresponding indicators in a status module change from said first state to said second state.

50. The interrupt modulator of claim 49, further comprising a mask, said mask comprising a set of entries corresponding to said virtual indicators and said status module indicators, and wherein a status module indicator changes state when a corresponding virtual indicator changes state if said corresponding entry in said mask is set to a predetermined value.

51. The interrupt modulator of claim 47, wherein said indicator is an alias module comprising an alias packet-transferred indicator configured to change from said first state to said second state when a packet-transferred indicator of a set of status indicators changes from said first state to said second state.

52. The interrupt modulator of claim 47, further comprising:

a set of status indicators configured to change from a first status state to a second status state in response to predetermined conditions in said communication device, wherein said set of status indicators includes said indicator;

a set of virtual status indicators, wherein each of said virtual status indicators is configured to change from said first status state to said second status state when a corresponding status indicator in said set of status indicators changes from said first status state to said second status state; and a set of return indicators, wherein each of said return indicators is configured to selectively indicate whether a predetermined status indicator in said set of status indicators is to be returned to said first status state when a corresponding virtual status indicator in said set of virtual status indicators returns to said first status state;

wherein one or more virtual status indicators in said set of virtual status indicators are returned from said second status state to said first status state when said poll is received.

53. A computer system for receiving packets from a network, comprising:

a packet-transferred indicator configured to indicate transfer of a first packet from a network interface, wherein said packet-transferred indicator changes from a first state to a second state in association with said transfer of said packet;

an alias packet-transferred indicator configured to change from said first state to said second state when said packet-transferred indicator changes from said first state to said second state;

a poller for polling said alias packet-transferred indicator to determine if a packet has been transferred; and a mask for selectively determining whether said packet-transferred indicator should be returned to said first state when said alias packet-transferred indicator is returned to said first state;

wherein said alias packet-transferred indicator is returned to said first state from said second state during a poll from said poller.

* * * * *